(12) United States Patent
Sakai et al.

(10) Patent No.: US 11,347,118 B2
(45) Date of Patent: May 31, 2022

(54) LIQUID CRYSTAL DISPLAY PANEL COMPRISING A RESIN LAYER HAVING A HEIGHT DIFFERENCE BETWEEN A PORTION OVER AN ELECTRODE AND A PORTION WITHIN A SLIT AND METHOD FOR MANUFACTURING THE SAME

(71) Applicant: Sharp Kabushiki Kaisha, Sakai (JP)

(72) Inventors: Akira Sakai, Sakai (JP); Masahiro Hasegawa, Sakai (JP); Miho Yamada, Sakai (JP); Yuichi Kawahira, Sakai (JP); Koji Murata, Sakai (JP); Kiyoshi Minoura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/393,439

(22) Filed: Aug. 4, 2021

(65) Prior Publication Data

US 2022/0043301 A1 Feb. 10, 2022

(30) Foreign Application Priority Data

Aug. 6, 2020 (JP) .............................. JP2020-133811

(51) Int. Cl.
*G02F 1/1343* (2006.01)
*G02F 1/1337* (2006.01)
(Continued)

(52) U.S. Cl.
CPC ...... *G02F 1/134363* (2013.01); *G02F 1/1337* (2013.01); *G02F 1/133345* (2013.01);
(Continued)

(58) Field of Classification Search
CPC ............. G02F 1/134381; G02F 1/1357; G02F 1/133357
See application file for complete search history.

(56) References Cited

U.S. PATENT DOCUMENTS

2005/0041182 A1* 2/2005 Ono ................... G02F 1/134363
349/106
2007/0070266 A1* 3/2007 Ochiai .............. G02F 1/134363
349/141

(Continued)

FOREIGN PATENT DOCUMENTS

JP 2003-057147 A 2/2003
JP 2014-215421 A 11/2014
WO 2008/053774 A1 5/2008

*Primary Examiner* — Paul C Lee
(74) *Attorney, Agent, or Firm* — Keating & Bennett, LLP

(57) ABSTRACT

A liquid crystal display panel includes a first substrate, a second substrate, a liquid crystal layer, a first polarizer plate, and a second polarizer plate. The first substrate includes a first dielectric substrate, a first electrode, a second electrode, and a first alignment film. The second electrode includes a plurality of slits and a conductive portion. The second substrate includes a second dielectric substrate and a second alignment film. The first substrate further includes a resin layer disposed between the second electrode and the first alignment film. The resin layer within the plurality of slits is as thick as or thicker than the second electrode. The plurality of slits are filled with the resin layer. A difference in height between the resin layer over the conductive portion of the second electrode and the resin layer within the plurality of slits of the second electrode is 10 nm or more.

17 Claims, 19 Drawing Sheets

(51) Int. Cl.
*G02F 1/1333* (2006.01)
*G02F 1/1335* (2006.01)
*G02F 1/135* (2006.01)

(52) U.S. Cl.
CPC .. *G02F 1/133357* (2021.01); *G02F 1/134318* (2021.01); *G02F 1/134381* (2021.01); *G02F 1/1357* (2021.01); *G02F 1/133531* (2021.01); *G02F 1/134336* (2013.01); *G02F 1/134372* (2021.01)

(56) References Cited

U.S. PATENT DOCUMENTS

| | | | |
|---|---|---|---|
| 2008/0018816 A1* | 1/2008 | Hattori | G02F 1/136213 |
| | | | 349/39 |
| 2014/0159070 A1* | 6/2014 | Hoka | H01L 27/124 |
| | | | 257/88 |
| 2014/0313462 A1* | 10/2014 | Kibe | G02F 1/134309 |
| | | | 349/106 |
| 2017/0039975 A1* | 2/2017 | Ito | G02F 1/133707 |

* cited by examiner

LIQUID CRYSTAL DISPLAY PANEL COMPRISING A RESIN LAYER HAVING A HEIGHT DIFFERENCE BETWEEN A PORTION OVER AN ELECTRODE AND A PORTION WITHIN A SLIT AND METHOD FOR MANUFACTURING THE SAME

CROSS-REFERENCE TO RELATED APPLICATION

The present application claims priority from Japanese Application JP2020-133811, the content of which is hereby incorporated by reference into this application.

BACKGROUND OF THE INVENTION

Field of the Invention

The disclosure relates to a liquid crystal display panel and a method for manufacturing the same. In particular, the present invention relates to a liquid crystal display panel that operates in transverse-field mode and to a method for manufacturing the same.

Description of the Related Art

Liquid crystal display panels that operate in transverse-field mode are used for various apparatuses ranging from large television receivers to small- and medium-sized mobile devices.

SUMMARY OF THE INVENTION

A liquid crystal display panel that has a pair of crossed-Nicols polarizer plates and operates in transverse-field mode unfortunately has a low contrast ratio (about 100 for instance) at an oblique visual angle (polar angle) in an azimuth dividing the azimuth of the orthogonal polarizing axes of these two polarizer plates (one is close to an observer or front, and the other is close to the backlight or backside) into half. Herein, an azimuth angle is defined as follows. Let the display surface of a liquid crystal display panel be seen as a clockface; accordingly, a 0° azimuth angle is in the direction of 3 o'clock, a 90° azimuth angle is in the direction of 12 o'clock, a 180° azimuth angle is in the direction of 9 o'clock, and a 270° or −90° azimuth angle is in the direction of 6 o'clock.

The above problem becomes apparent, for instance, as a halo that occurs in a liquid crystal display panel having a front polarizer plate whose polarizing axis has a 90° (−90°) azimuth angle. The halo becomes conspicuous particularly at an oblique visual angle (a 60° polar angle for instance) at azimuth angles of ±45 degrees and ±135 degrees when the panel's backlight undergoes multi-division driving. Hereinafter for easy description, the panel has a low contrast ratio (or has a conspicuous halo) at an oblique azimuth and an oblique visual angle.

The inventors studied the cause of the problem, i.e., why a liquid crystal display panel that operates in transverse-field mode has a low contrast ratio at an oblique azimuth and an oblique visual angle. Their study has revealed that the problem is partly caused by the structure of a comb-shaped electrode in a liquid crystal display panel that operates in IPS mode, and by the structure of an electrode (a pixel electrode or a common electrode) having slits in a liquid crystal display panel that operates in FFS mode. A structure like these electrodes, where a plurality of slits and strip-shaped conductive portions divided by the slits are arranged, generates a difference in refractive index between the stripe-shaped conductive portions (of high refractive index) and a liquid crystal layer (of low refractive index) within the slits sandwiched by these conductive portions. The difference in refractive index causes diffraction, thus lowering the contrast ratio at an oblique azimuth and an oblique visual angle.

A conventional attempt for solving this problem is to flatten the optical structure of the electrode by filling the gaps between the stripe-shaped conductive portions (i.e., the inside of the slits) with a high-refractive-index resin (including a particle-containing resin composition) having a refractive index close to the refractive index of the conductive portions (see International Publication No. 2008/053774 for instance). However, the gaps between the conductive portions cannot be sufficiently flattened unless the high-refractive-index resin layer is thick enough. To solve this problem, International Publication No. 2008/053774 discloses forming, as a dummy layer, a light-transparent member having a refractive index closer to that of the conductive portions in the gaps of the conductive portions, followed by forming a high-refractive-index resin layer so as to cover the conductive portions and light-transparent member.

The technique in International Publication No. 2008/053774, which includes forming the light-transparent member in the electrode gaps and forming the high-refractive-index resin layer over the electrode conductive portions and light-transparent member, leads to an increase in manufacturing cost.

It is an object of the disclosure to provide a transverse-field-mode liquid crystal display panel that can be manufactured at lower cost than the technique described in International Publication No. 2008/053774, and that prevents contrast ratio lowering resulting from the diffraction of light caused by an electrode structure. It is also an object of the present invention to provide a method for manufacturing the liquid crystal display panel.

A preferred embodiment of the present invention provides solutions described in the following aspects.

First Aspect

A first aspect of the present invention provides a liquid crystal display panel that includes the following: a first substrate; a second substrate facing the first substrate; a liquid crystal layer disposed between the first and second substrates; a first polarizer plate disposed across the first substrate from the liquid crystal layer; and a second polarizer plate disposed across the second substrate from the liquid crystal layer. The first substrate includes the following: a first dielectric substrate; a first electrode and a second electrode both disposed on the first dielectric substrate and capable of generating a transverse electric field in the liquid crystal layer; and a first alignment film being in contact with the liquid crystal layer. The second electrode includes a plurality of slits and a conductive portion. The second substrate includes a second dielectric substrate, and a second alignment film disposed on the second dielectric substrate and being in contact with the liquid crystal layer. The first substrate further includes a resin layer disposed between the second electrode and the first alignment film. The resin layer is made of a resin having a refractive index different from the refractive index of the second electrode by 0.20 or less. The resin layer within the plurality of slits is as thick as or thicker than the second electrode. The plurality of slits are filled with the resin layer. The difference in height between the resin layer over the conductive portion of the second electrode and the resin layer within the plurality of slits of the second electrode is 10 nm or more.

Second Aspect

In the liquid crystal display panel according to the first aspect, the first electrode is more remote from the liquid crystal layer than the second electrode is, so as to face the second electrode with a dielectric layer interposed between the first and second electrodes. In addition, the first electrode has no slits.

Third Aspect

In the liquid crystal display panel according to the first or second aspect, the conductive portion of the second electrode has a hydrophilic surface.

Fourth Aspect

In the liquid crystal display panel according to any one of the first to third aspects, the resin layer within the plurality of slits is thicker than the second electrode by two times or more.

Fifth Aspect

In the liquid crystal display panel according to any one of the first to fourth aspects, the first alignment film has an azimuth anchoring strength of $1 \times 10^{-7}$ to $1 \times 10^{-5}$ $J/m^2$ inclusive.

Sixth Aspect

In the liquid crystal display panel according to any one of the first to fifth aspects, the second alignment film has an azimuth anchoring strength of $1 \times 10^{-3}$ $J/m^2$ or more.

Seventh Aspect

In the liquid crystal display panel according to any one of the first to sixth aspects, the resin layer has a refractive index equal to or smaller than ±10% of a refractive index of the second electrode.

Eighth Aspect

In the liquid crystal display panel according to any one of the first to seventh aspects, the second electrode is composed of a transparent conductive layer.

Ninth Aspect

In the liquid crystal display panel according to any one of the first to eighth aspects, the second polarizer plate has an absorption axis forming, along with a direction where the plurality of slits extend, an angle of 5 to 10 degrees inclusive.

Tenth Aspect

In the liquid crystal display panel according to any one the first to ninth aspects, the liquid crystal display panel has a contrast ratio of 200 or more, on an average of pairs of a 45° azimuth angle and a 60° polar angle, a −45° azimuth angle and a 60° polar angle, a 135° azimuth angle and a 60° polar angle, and a −135° azimuth angle and a 60° polar angle.

Eleventh Aspect

An eleventh aspect provides a method for manufacturing the liquid crystal display panel according to any one of the first to tenth aspects. The method includes applying, with an applicator, the resin onto the second electrode to form the resin layer.

Twelfth Aspect

A twelfth aspect provides a method for manufacturing the liquid crystal display panel according to any one of the first to tenth aspects. The method includes applying the resin onto the second electrode through spin coating to form the resin layer.

Thirteenth Aspect

In the method according to the twelfth aspect, the step of applying the resin through spin coating is performed a plurality of times.

Fourteenth Aspect

The method according to any one of the eleventh to thirteenth aspects further includes before the applying step, processing a surface of the second electrode into a hydrophilic surface.

Fifteenth Aspect

In the method according to the fourteenth aspect, the processing step includes irradiating the surface of the second electrode with excimer UV rays.

The preferred embodiment of the present invention provides a transverse-field-mode liquid crystal display panel that can be manufactured at lower cost than before and that has an improved contrast ratio at an oblique azimuth and an oblique visual angle. The preferred embodiment also provides a method for manufacturing the liquid crystal display panel.

DETAILED DESCRIPTION OF THE INVENTION

With reference to the drawings, the following describes a liquid crystal display panel and a method for manufacturing the same according to a preferred embodiment of the present invention. The preferred embodiment of the present invention is not limited to example descriptions below.

Figure 1A:
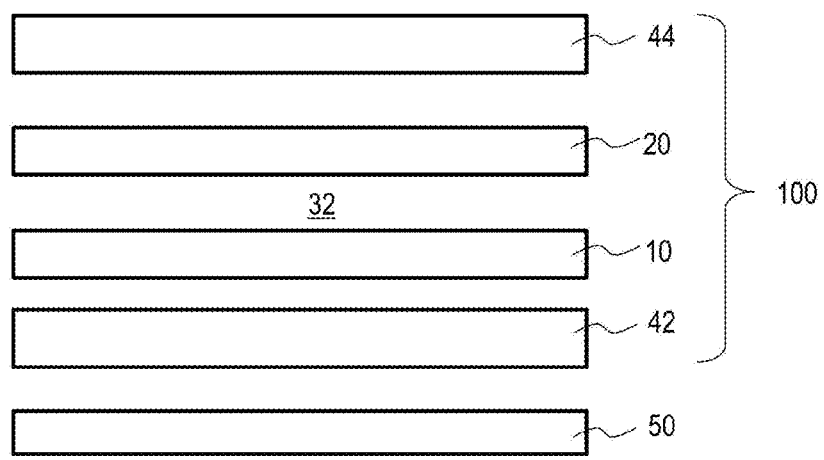
FIG. 1A is a schematic exploded sectional view of a liquid crystal display panel 100 according to a preferred embodiment of the present invention and illustrates a backlight 50 as well.
Figure 1B:
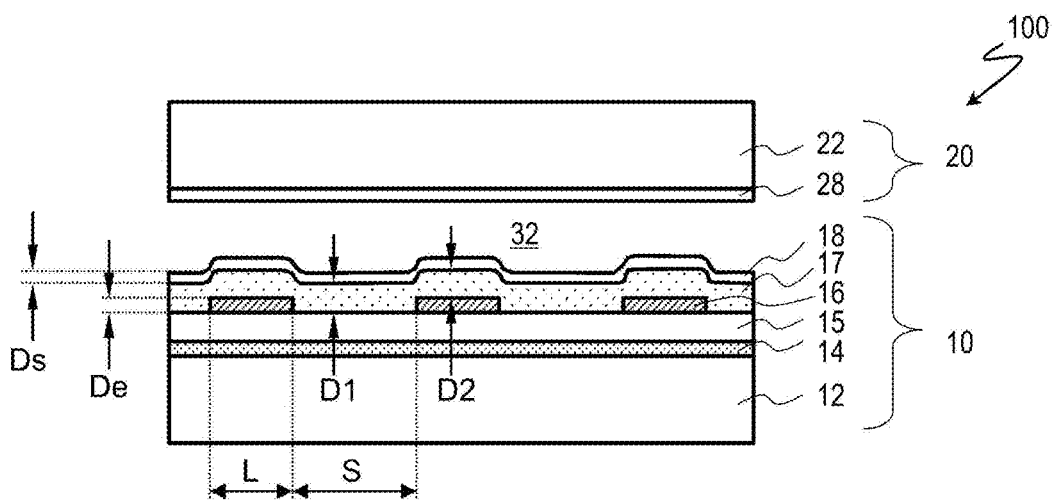
FIG. 1B is a schematic sectional view of a portion corresponding to one pixel of the liquid crystal display panel 100.
Figure 1C:
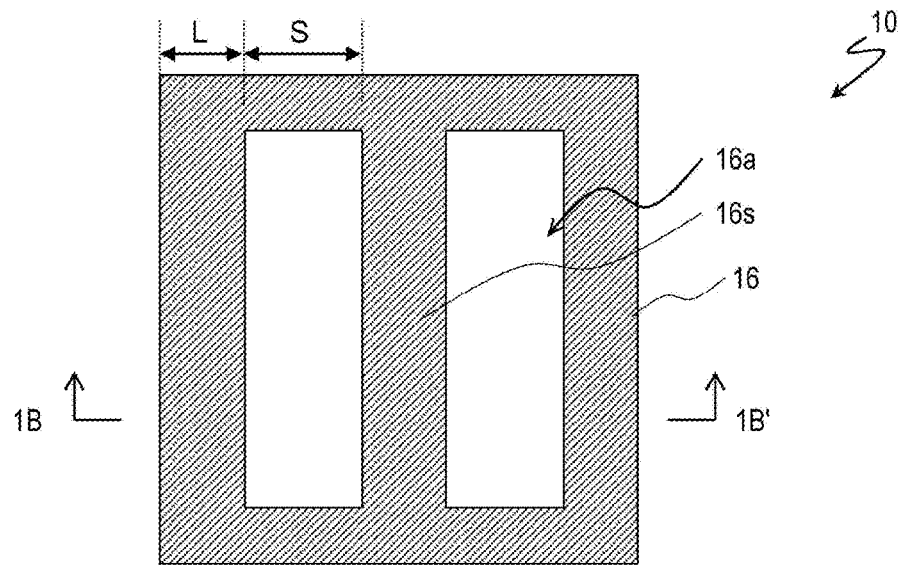
FIG. 1C is a schematic plan view of a portion corresponding to one pixel of the liquid crystal display panel 100.

A liquid crystal display panel 100 according to the preferred embodiment of the present invention will be described with reference to FIGS. 1A, 1B and 1C. FIG. 1A is a schematic exploded sectional view of the liquid crystal display panel 100 according to the preferred embodiment of the present invention and illustrates a backlight 50 as well. The liquid crystal display panel 100, the backlight 50, a power source device, and other components constitute a liquid crystal display. The liquid crystal display panel 100 has a plurality of pixels arranged in matrix (i.e., in rows and columns) FIG. 1B is a schematic sectional view of a portion corresponding to one pixel of the liquid crystal display panel 100 and is a sectional view taken along line 1B-1B' in FIG. 1C. FIG. 1C is a schematic plan view of a portion corresponding to one pixel of the liquid crystal display panel 100.

The liquid crystal display panel 100 includes the following components: a TFT substrate (first substrate or back substrate) 10; a counter substrate (second substrate) 20 facing the TFT substrate 10; a liquid crystal layer 32 disposed between the TFT substrate 10 and counter substrate 20; a first polarizer plate 42 disposed on the panel backside (that is, the first polarizer plate 42 is disposed across the TFT substrate 10 from the liquid crystal layer 32); and a second polarizer plate 44 disposed near an observer (that is, the second polarizer plate 44 is disposed across the counter substrate 20 from the liquid crystal layer 32). A single retardation plate or two or more retardation plates can be placed, as necessary, between the TFT substrate 10 and first polarizer plate 42 and/or the counter substrate 20 and second polarizer plate 44.

The TFT substrate 10 includes the following components: a glass substrate (first dielectric substrate) 12; a first electrode 14 and a second electrode 16 both disposed on the glass substrate 12 and capable of generating a transverse electric field in the liquid crystal layer 32; and a first alignment film 18 being in contact with the liquid crystal layer 32. The second electrode 16 has a plurality of slits 16a. The second electrode 16 is disposed closer to the liquid crystal layer 32 than the first electrode 14 is, so as to face the first electrode 14 with the dielectric layer 15 interposed therebetween. The liquid crystal display panel 100 is a liquid crystal display panel that operates in FFS mode. The first electrode 14 herein is a flat electrode having no slits. For instance, the first electrode 14 is a common electrode, and the second electrode 16 is a pixel electrode. In some preferred embodiments, the first electrode 14 may be a pixel electrode, and the second electrode 16 may be a common electrode. The second electrode 16 herein has the plurality of slits 16a (a plurality of rectangular openings extending in parallel to each other), and a plurality of straight portions 16s divided by the slits 16a. The second electrode 16 excluding the slits 16a is referred to as a conductive portion. The conductive portion of the second electrode 16 includes the straight portions 16s. The slits of the second electrode 16 may be openings or cuts. Each straight portion 16s has a width L of 1 to 8 μm inclusive for instance. Each slit 16a has a width S of 2 to 10 μm inclusive for instance. The width L is preferably equal to or smaller than the width S. The number of slits 16a in the drawing is mere an example, and at least two slits 16a need to be provided. The number of slits 16a can be changed, as necessary, in accordance with pixel size and other things. Although the thickness De of the second electrode 16 (i.e., the thickness of the conductive portion) is non-limiting, the thickness De is 20 to 200 nm inclusive for instance.

The second electrode 16 has a refractive index of 1.70 to 2.10 inclusive for instance. The second electrode 16 is composed of, for instance, a transparent conductive layer having a refractive index of about 1.8, an indium-tin-oxide (ITO) layer (having a refractive index of about 1.70 to 2.10), an indium-zinc-oxide (IZO, a registered trademark) layer (having a refractive index of about 1.70 to 2.10), or an oxide layer of these materials mixed together.

The counter substrate 20 includes a glass substrate 22 (second dielectric substrate). The counter substrate 20 also includes a second alignment film 28 disposed on the glass substrate 22 and being in contact with the liquid crystal layer 32.

The TFT substrate 10 further includes a resin layer 17 disposed between the second electrode 16 and first alignment film 18. The resin layer 17 is provided to fill the slits 16a of the second electrode 16. The resin layer 17 has a refractive index different from the refractive index of the second electrode 16 by 0.20 or less. The resin layer 17 within the slits 16a has a thickness D1 equal to or greater than the thickness De of the second electrode 16. The slits 16a are filled with the resin layer 17. The difference in height between the resin layer 17 over the conductive portion of the second electrode 16 and the resin layer 17 within the slits 16a of the second electrode 16 (i.e., a surface level difference Ds of the resin layer 17) is 10 nm or more. The surface level difference Ds of the resin layer 17 can be also calculated from an expression Ds=D2+De−D1, where D2 denotes the thickness of the resin layer 17 over the conductive portion of the second electrode 16. For instance, the thickness D1 of the resin layer 17 within the slits 16a may be greater than the thickness De of the second electrode 16 by two times or more, or by 2.5 times or more. Although the thickness D1 of the resin layer 17 within the slits 16a has no upper limit, the thickness D1 is greater than the thickness De of the second electrode 16 by six times or less for instance. For instance, the surface level difference Ds of the resin layer 17 may be 30 nm or more, or 50 nm or more.

Figure 2A:
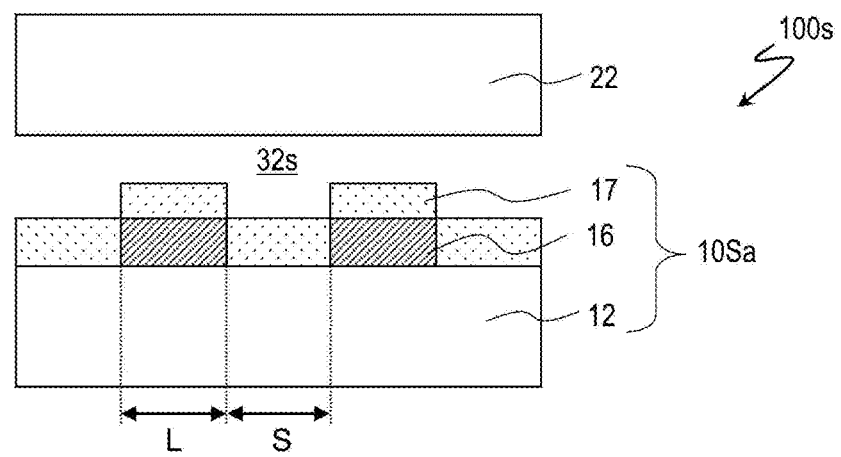
FIG. 2A is a schematic sectional view of a sample panel in Example 1.

An experiment, described later on, has demonstrated that filling the slits 16a of the second electrode 16 with the resin layer 17 cannot completely flatten the asperities of the second electrode 16, and that the surface level difference Ds remains in the resin layer 17 to a predetermined or more extent. The inventors have found out that the resin layer 17 can improve the contrast ratio of a liquid crystal display panel that operates in transverse-field mode, at an oblique azimuth and an oblique visual angle even though the surface level difference Ds remains in the resin layer 17 to a predetermined or more extent. In some cases, when the thickness D1 of the resin layer 17 within the slits 16a is equal to the thickness De of the second electrode 16, the resin layer 17 is separated into a portion disposed over the conductive portion of the second electrode 16, and a portion disposed within the slits 16a of the second electrode 16, as described later on. FIG. 2A for instance shows, for easy illustration, a non-limiting example where these portions are separated from each other. However, it is common that the resin layer 17 over the conductive portion of the second electrode 16 and the resin layer 17 within the slits 16a of the second electrode 16 are connected together smoothly and are thus continuous. Even when the resin layer 17 over the conductive portion of the second electrode 16 and the resin layer 17 within the slits 16a of the second electrode 16 are separated, the surface level difference Ds of the resin layer 17 still refers to the difference in height between the resin layer 17 over the conductive portion of the second electrode 16 and the resin layer 17 within the slits 16a of the second electrode 16.

The refractive index of the resin layer 17 is 1.60 to 2.00 inclusive for instance. The refractive index of the resin layer 17 is, for instance, ±15% or less of the refractive index of the second electrode 16 (i.e., 85% or more and 115% or less of the refractive index of the second electrode 16) and may be ±10% or less of the refractive index of the second electrode 16 (i.e., 90% or more and 110% or less of the refractive index of the second electrode 16). A usable example of the resin contained in the resin layer 17 is a triazine polymer, such as the HYPERTECH (registered trademark) UR series, made by NISSAN CHEMICAL CORPORATION. Another usable example of the resin is an episulfide resin, such as the Lumiplus (registered trademark) series, made by MITSUBISHI GAS CHEMICAL COMPANY, INC.

The resin layer 17 can be formed by applying resin onto the second electrode 16 through, for instance, spin coating, slit coating or bar coating, or with an applicator. Before the resin layer 17 is formed, the second electrode 16 may undergo processing to have a hydrophilic surface (through excimer UV irradiation for instance).

The liquid crystal display panel 100 includes the resin layer 17 provided to fill the slits 16a of the second electrode 16, thereby improving its contrast ratio at an oblique azimuth and an oblique visual angle. For instance, the contrast ratio is preferably 200 or more and is more preferably 300 or more, on the average of pairs of a 45° azimuth angle and a 60° polar angle, of a −45° azimuth angle and a 60° polar angle, of a 135° azimuth angle and a 60° polar angle, and of a −135° azimuth angle and a 60° polar angle.

Although the mechanism of how the resin layer 17 improves the contrast ratio at an oblique azimuth and an oblique visual angle has not been completely revealed, the resin layer 17 disposed within at least the slits 16a of the second electrode 16 seems to contribute to reducing the difference in optical-path length between light passing through the conductive portion of the second electrode 16 and light passing through the slits 16a of the second electrode 16. In addition, as a result of providing the resin layer 17, both the interface between the conductive portion of the second electrode 16 and the liquid crystal layer 32 and the interface between the base within the slits 16a and the liquid crystal layer 32 constitute the interface between the resin layer 17 and liquid crystal layer 32. This seems to contribute to the foregoing reduction in the difference as well. It is noted that the alignment film over the second electrode 16 has a refractive index of about 1.55 to 1.75, and a thickness of about 50 to 100 nm. Hence, the alignment film alone seems to a little improve the contrast ratio at an oblique azimuth and an oblique visual angle. Referring to the refractive index of liquid crystals contained in the liquid crystal layer 32, the liquid crystals commonly have an ordinary-light refractive index no of about 1.47 to 1.50, and an extraordinary-light refractive index ne of about 1.55 to 1.61.

In the liquid crystal display panel 100, the first alignment film 18 may be a weak-anchoring alignment film (for instance, having an azimuth anchoring strength of $1 \times 10^{-7}$ to $1 \times 10^{-5}$ J/m$^2$ inclusive). If the resin layer 17 has a large thickness, effective voltage applied to the liquid crystal layer lowers, thereby possibly shifting a voltage-transmittance curve toward high voltage. Using a weak-anchoring alignment film as the first alignment film 18 can prevent this lowering and shifting. However, when the voltage-transmittance curve shifts toward high voltage to a sufficiently small extent, a weak-anchoring alignment film does not necessarily have to be used as the first alignment film 18, and a strong-anchoring alignment film, having a higher azimuth anchoring strength than a weak-anchoring alignment film, may be used as the first alignment film 18. The strong-anchoring alignment film has an azimuth anchoring strength of $1 \times 10^{-3}$ J/m² or more for instance. The strong-anchoring alignment film is a polyimide alignment film for instance. The second alignment film 28 needs to be such a strong-anchoring alignment film.

A weak-anchoring alignment film refers to an alignment film, such as a polymer brush or polymethylmethacrylate (PMMA), that has a low strength of alignment control within its plane (horizontal plane) or has no such strength. A weak-anchoring alignment film can be formed using, for instance, a polymer brush as described in Japanese Patent Application Laid-Open No. 2014-215421. For reference, the entire disclosure of Japanese Patent Application Laid-Open No. 2014-215421 is incorporated into the Description. Anchoring strength refers to strength by which an alignment film controls the alignment direction of liquid crystal molecules (directors). Anchoring strength includes two different types: one is polar-angle anchoring strength, which is exerted on the rotation of liquid crystal molecules in the direction of the normal to a substrate; and the other is azimuth anchoring strength, which is exerted on the rotation of liquid crystal molecules in the in-plane direction of a substrate. In a liquid crystal display panel that operates in transverse-field mode, only azimuth anchoring strength needs to be reflected. Azimuth anchoring strength can be measured by, for instance, the method described in Japanese Patent Application Laid-Open No. 2003-57147.

The electrode structure of the liquid crystal display panel according to the preferred embodiment of the present invention is not limited to what is illustrated herein, and the electrode structure of a publicly known, liquid crystal display panel that operates in transverse-field mode is widely applicable. Reference is made to a typical example where a positive nematic liquid crystal, the dielectric constant anisotropy of which is positive, is used. Accordingly, the absolute value of the angle between the direction where the slits 16a of the second electrode 16 extend and the alignment azimuth of the first alignment film 18 is 1 to 15 degrees inclusive (preferably, 5 to 10 degrees inclusive). Reference is also made to another typical example where a negative nematic liquid crystal, the dielectric constant anisotropy of which is negative, is used. Accordingly, the absolute value of the angle between a direction perpendicular to the direction where the slits 16a of the second electrode 16 extend and the alignment azimuth of the first alignment film 18 is 1 to 15 degrees inclusive (preferably, 5 to 10 degrees inclusive). To achieve high display mode efficiency (transmittance in white display), and by extension, to achieve a high contrast ratio in the direction of a normal and an oblique direction, the angle between the absorption axis of the second polarizer plate 44 and the direction where the slits 16a of the second electrode 16 extend is preferably, for instance, 5 to 10 degrees inclusive. In addition, to achieve the forgoing efficiency and ratio, the absorption axis of the second polarizer plate 44 and the alignment azimuth of the first alignment film 18 are preferably parallel or orthogonal to each other.

The liquid crystal display panel 100 can be manufactured at lower cost than the liquid crystal display panel described in International Publication No. 2008/053774. The technique in International Publication No. 2008/053774 includes filling electrode gaps with a light-transparent member, and covering an electrode conductive portion and the light-transparent member with a high-refractive-index resin layer. The light-transparent member, which is provided for, together with the high-refractive-index resin, flattening the electrode gaps, needs to be provided in only the electrode gaps. That is, the light-transparent member is formed by forming an inorganic insulating film onto an electrode having slits and then patterning the film. In contrast, the liquid crystal display panel 100, which includes no light-transparent member but includes the resin layer 17 on the second electrode 16, saves manufacturing costs.

The technique in International Publication No. 2008/053774 includes flattening the electrode gaps, thereby preventing a reduction in contrast ratio at an oblique azimuth and an oblique visual angle. In contrast, the inventors have found out that the resin layer 17 can improve the contrast ratio of a liquid crystal display panel that operates in transverse-field mode, at an oblique azimuth and an oblique visual angle even if the surface level difference Ds remains in the resin layer 17 on the second electrode 16 to a predetermined or more extent. The inventors unexpectedly achieved this finding, in which the resin layer 17 improves the contrast ratio at an oblique azimuth and an oblique visual angle even if the surface level difference Ds remains in the resin layer 17 to a predetermined or more extent, that is, even if the asperities of the second electrode 16 are not completely flattened by the resin layer 17.

The following describes examples, a comparative example, and a reference example. The inventors examined the contrast ratio at an oblique azimuth and an oblique visual angle by using more simply structured sample panels than the liquid crystal display panel 100.

Example 1

FIG. 2A is a schematic sectional view of a sample panel 100s in Example 1. As illustrated in FIG. 2A, the sample panel 100s in Example 1 is provided in imitation of a liquid crystal display panel. The sample panel 100s includes a sample substrate 10Sa (provided in imitation of a TFT substrate), the glass substrate 22 (provided in imitation of a counter substrate), a liquid crystal layer 32s (provided in imitation of a liquid crystal layer) disposed between these substrates, and polarizer plates (not shown) disposed on both sides. The sample substrate 10Sa includes the glass substrate 12, the second electrode 16 on the glass substrate 12, and the resin layer 17 on the second electrode 16. Disposed between the sample substrate 10Sa and the lower polarizer plate is a retardation plate (not shown) provided for enlarging a viewing angle. Although FIG. 2A shows, for easy illustration, that the shape of the resin layer 17 in sectional view is angular, like the shape of the second electrode 16 in sectional view, the sectional shape of the resin layer 17 covering the second electrode 16 is typically rounded. This holds true for FIG. 3A and the subsequent drawings.

The individual components of the sample panel in Example 1 as produced will be listed below.

A liquid crystal layer 32s is made of glycerin and has a refractive index of 1.47;

The glass substrates 12 and 22 each have a thickness of 0.5 mm and a refractive index of 1.526;

The second electrode 16 is an ITO layer having a refractive index of 1.72 and a thickness De of 108 nm;

The resin layer 17 is Lumiplus LPL-1150, made by MITSUBISHI GAS CHEMICAL COMPANY, INC, and has a refractive index of 1.76;

Forming the resin layer 17 uses spin coating; and

The condition for forming the resin layer 17 includes applying resin onto the second electrode 16 on the condition (the number of rotations and time) where a 50 nm thick resin layer is formed onto a flat surface (e.g., a bare-glass surface).

Table 1 shows the thicknesses D1 and D2 of the resin layer 17 as actually formed, and the surface level difference Ds of the resin layer 17 as actually formed.

The second electrode 16 has the electrode structure illustrated in FIG. 1C. The second electrode 16 has a width L of 5 µm and a width S of 3 µm.

Figure 2B:
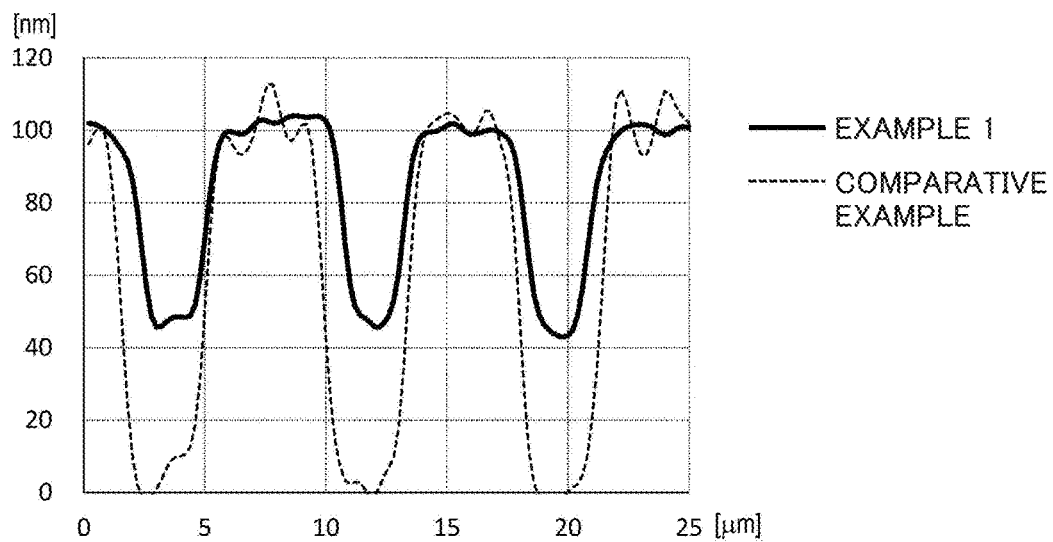
FIG. 2B is a graph showing measurements of the surface profile (the profile of a surface near a resin layer 17) of a sample substrate 10Sa, which is used for the sample panel in Example 1.

FIG. 2B is a graph showing measurements of the surface profile (the profile of a surface near the resin layer 17) of the sample substrate 10Sa, which is used for the sample panel in Example 1. In FIG. 2B, the surface profile of the sample substrate 10Sa is denoted by a solid line, and a surface profile in a comparative example (FIG. 11A), where no resin layer 17 is provided, is denoted by a broken line. The drawing shows the solid and broken lines in such a manner that their peaks are flush. This holds true for the subsequent drawings illustrating surface profile measurements. The surface profile was measured using a contact surface-level-difference measuring instrument (i.e., P-16+, made by KLA-TENCOR CORPORATION INC.).

Figure 2C:
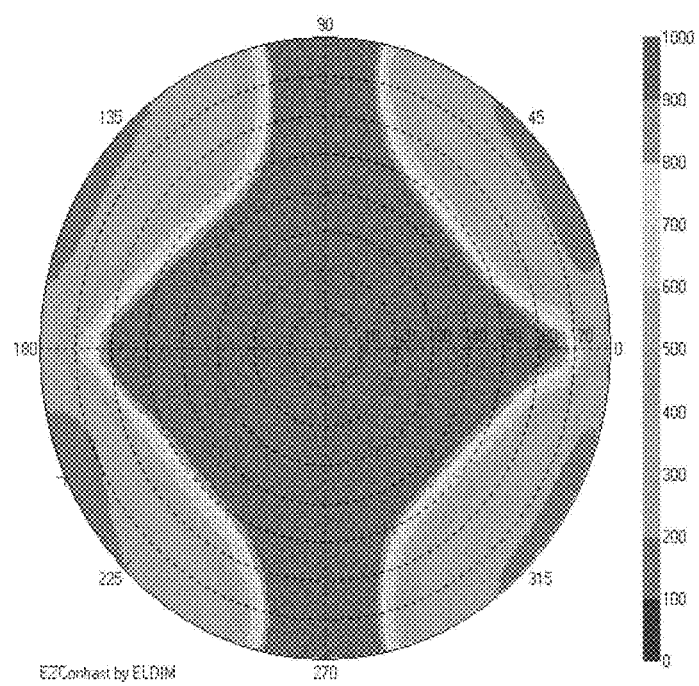
FIG. 2C is a diagram illustrating an iso-contrast curve of the sample panel and other things in Example 1.

FIG. 2C is a diagram illustrating the contrast ratio calculated for each azimuth angle and polar angle in the sample panel in Example 1. That is, FIG. 2C is an iso-contrast curve. In the drawing, the seven concentric circles denoted by broken lines indicate polar angles of 10°, 20°, 30°, 40°, 50°, 60° and 70° in ascending radius order, and their outside circle denoted by a solid line indicates a polar angle of 80°. In each circle, a 0° azimuth angle is in the direction of 3 o'clock on the clockface; a 90° azimuth angle is in the direction of 12 o'clock on the same, a 180° azimuth angle is in the direction of 9 o'clock on the same, and a 270° or −90° azimuth angle is in the direction of 6 o'clock. This holds true for the subsequent iso-contrast curves.

The inventors calculated, as the contrast ratio, the ratio of transmittance of a parallel Nicols arrangement of the first polarizer plate 42 and second polarizer plate 44 to the transmittance of a crossed Nicols arrangement of the first polarizer plate 42 and second polarizer plate 44. The inventors arranged the polarizer plates in such a manner that the angle between the absorption axis of the second polarizer plate 44 and the direction where the slits 16a of the second electrode 16 extended was 7 degrees. The inventors measured the transmittance for each of the crossed Nicols arrangement and parallel Nicols arrangement to determine the contrast ratio. Referring to the transmittance, the inventors determined the average of the transmittance in all wavelengths in a visible-light region.

Figure 2D:
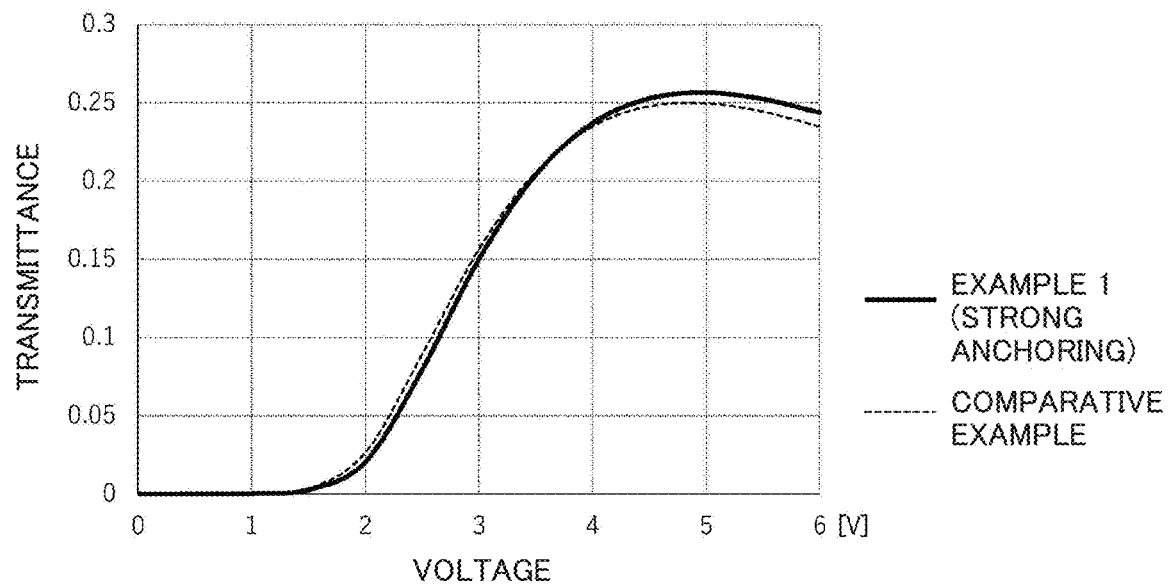
FIG. 2D is a graph showing simulated calculations of the ratio of transmittance in a liquid crystal cell to applied voltage (voltage-transmittance curve) in Example 1.

FIG. 2D is a graph showing simulated calculations of the ratio of transmittance in a liquid crystal cell to applied voltage (voltage-transmittance curve) in Example 1. The liquid crystal cell in Example 1 has a structure similar to that of the portion corresponding to the one pixel of the liquid crystal display panel 100 illustrated in FIG. 1B. FIG. 2D shows a solid line, which denotes the calculations in the liquid crystal cell in Example 1, and a thin broken line, which denotes the calculations in a liquid crystal cell in the comparative example. Unlike the liquid crystal cell in Example 1, the liquid crystal cell in the comparative example has no resin layer 17. In this simulation, the inventors used LCD Master, made by Thing Tech Co., Ltd. The individual components of the liquid crystal cell in Example 1 will be listed below. The liquid crystal cell includes the substrates 12 and 22, the second electrode 16, and the resin layer 17, all of which are the same as those included in the sample panel in Example 1 and will not be elaborated upon.

The first alignment film 18 has an azimuth anchoring strength of $1 \times 10^3$ J/m$^2$ (a strong-anchoring alignment film);

The second alignment film 28 has an azimuth anchoring strength of $1 \times 10^3$ J/m$^2$ (a strong-anchoring alignment film);

The liquid crystal layer 32 is made of a liquid crystal material that satisfies Δn=0.103, and the layer has a cell thickness d of 3.045 µm (Δn·d=314 nm);

The first electrode 14 is a 105 nm thick flat electrode, which is an ITO layer; and The dielectric layer 15 is a 400 nm thick SiN layer.

Second Example

Figure 3A:
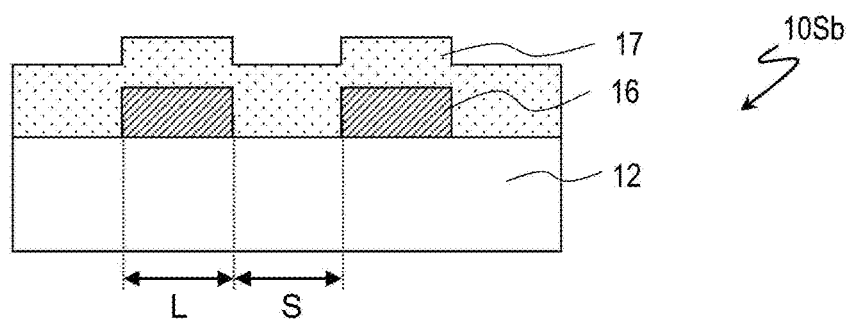
FIG. 3A is a schematic sectional view of a sample substrate 10Sb, which is used for a sample panel in Example 2.

FIG. 3A is a schematic sectional view of a sample substrate 10Sb, which is used for a sample panel in Example 2. Unlike the sample panel in Example 1, which includes the sample substrate 10Sa, the sample panel in Example 2 includes the sample substrate 10Sb. The sample substrate 10Sb of the sample panel in Example 2 is different from the sample substrate 10Sa in Example 1 with regard to the condition for forming the resin layer 17. In Example 2, the inventors applied resin onto the second electrode 16 on the condition that a 150 nm thick resin layer is formed onto a flat surface.

Figure 3B:
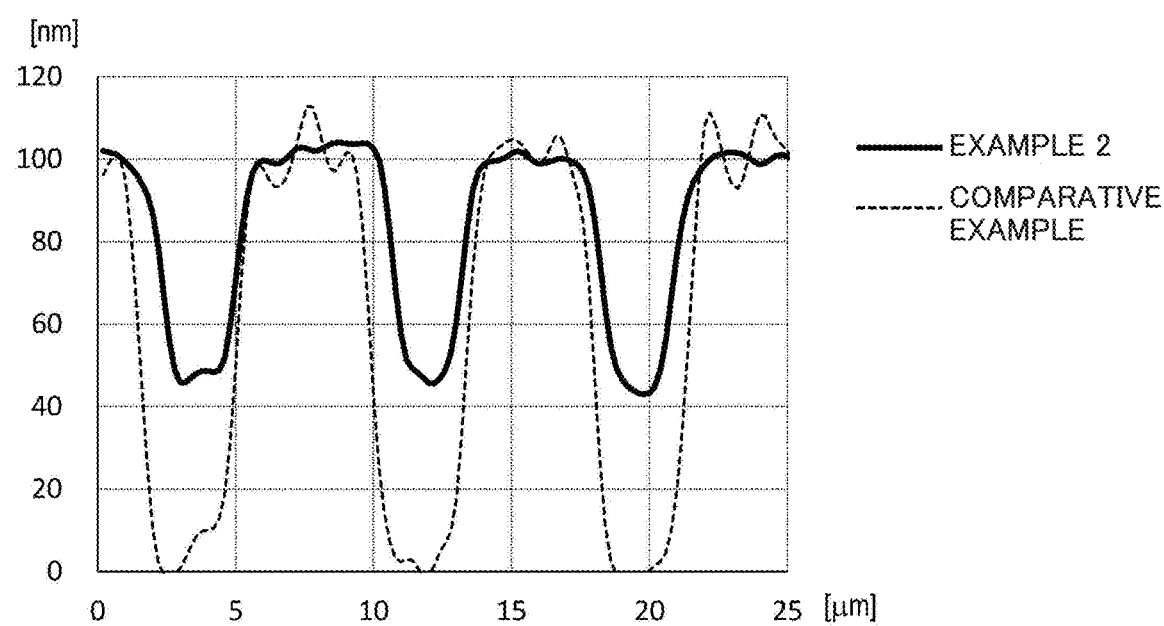
FIG. 3B is a graph showing measurements of the surface profile (the profile of a surface near the resin layer 17) of the sample substrate 10Sb.
Figure 3C:
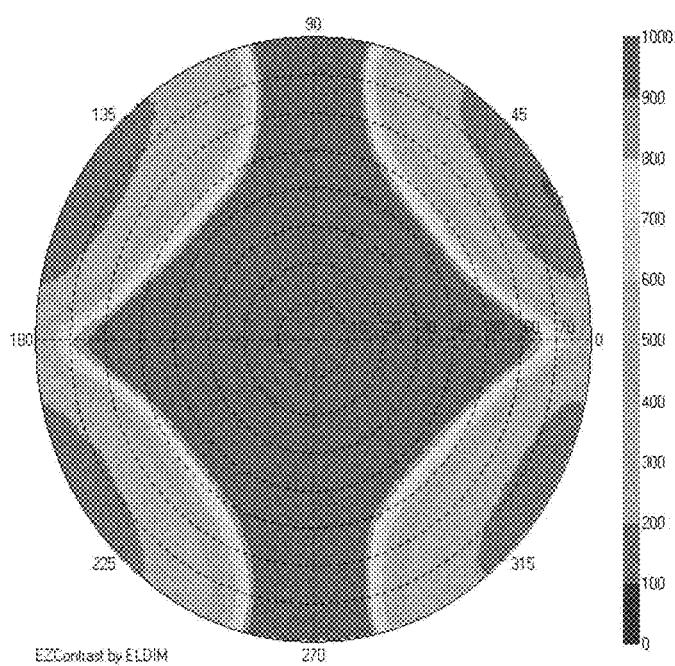
FIG. 3C is a diagram illustrating an iso-contrast curve of the sample panel in Example 2.
Figure 3D:
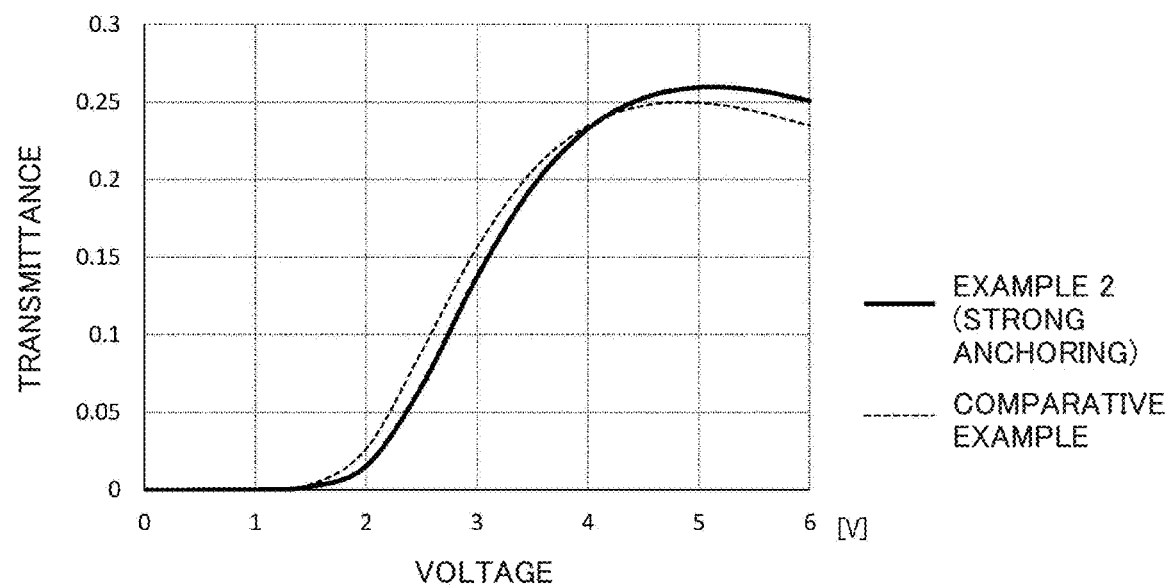
FIG. 3D is a graph showing simulated calculations of the ratio of transmittance in a liquid crystal cell to applied voltage (voltage-transmittance curve) in Example 2.
Figure 3E:
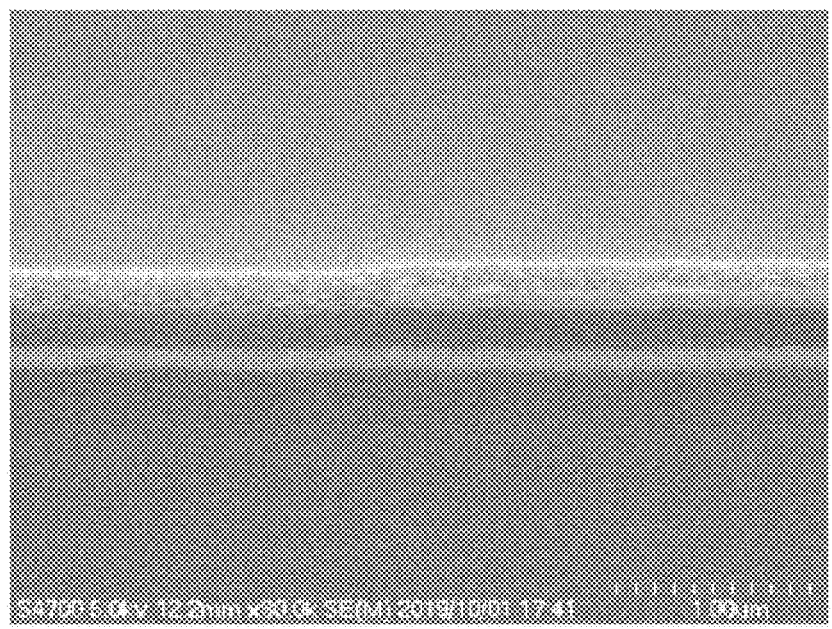
FIG. 3E is a sectional view of an SEM image of the sample substrate 10Sb.

FIG. 3B is a graph showing measurements of the surface profile (the profile of a surface near the resin layer 17) of the sample substrate 10Sb, which is used in the sample panel in Example 2. FIG. 3C is a diagram illustrating an iso-contrast curve of the sample panel in Example 2. FIG. 3D is a graph showing simulated calculations of the ratio of transmittance in a liquid crystal cell to applied voltage (voltage-transmittance curve) in Example 2. Unlike the liquid crystal cell in Example 1, the liquid crystal cell in Example 2 has the resin layer 17 of the same thickness as the resin layer 17 of the sample panel in Example 2. FIG. 3E is a sectional view of an SEM image of the sample substrate 10Sb, which is used for the sample panel in Example 2.

Example 3

A sample panel in Example 3 includes a sample substrate different from the sample substrate 10Sb in Example 2 in that before the resin layer 17 is formed through spin coating, the second electrode 16 undergoes excimer UV irradiation (a wavelength of 172 nm) to have a hydrophilic surface.

Figure 4A:
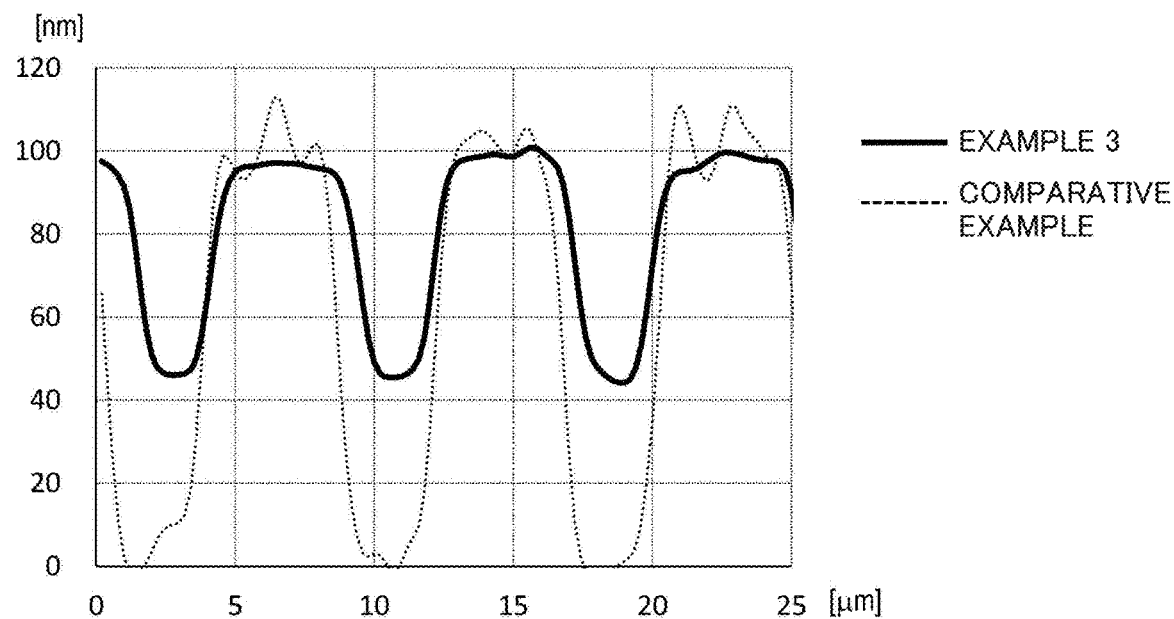
FIG. 4A is a graph showing measurements of the surface profile (the profile of a surface near a resin layer 17) of a sample substrate used for a sample panel in Example 3.
Figure 4B:
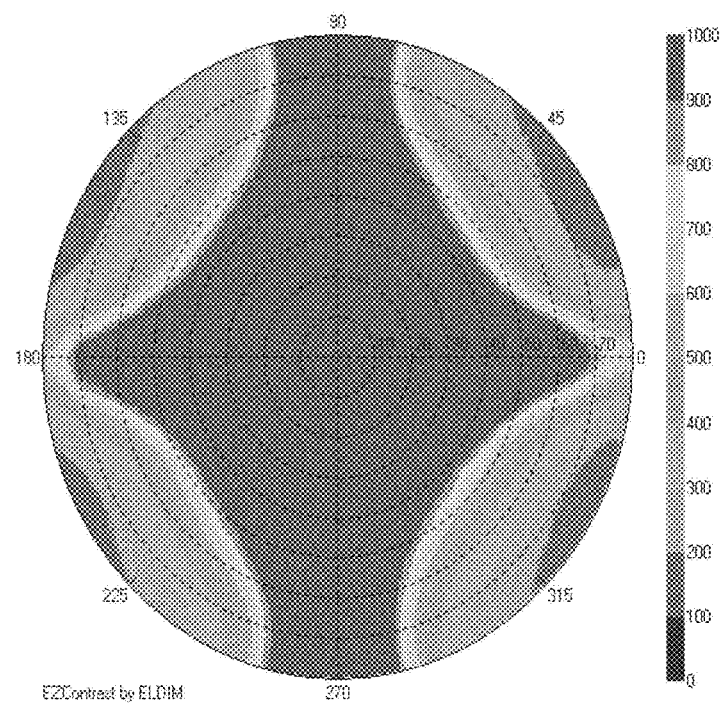
FIG. 4B is a diagram illustrating an iso-contrast curve of the sample panel in Example 3.
Figure 4C:
FIG. 4C is a sectional view of an SEM image of the sample substrate used for the sample panel in Example 3.

FIG. 4A is a graph showing measurements of the surface profile (the profile of a surface near the resin layer 17) of the sample substrate used for the sample panel in Example 3. FIG. 4B is a diagram illustrating an iso-contrast curve of the sample panel in Example 3. FIG. 4C is a sectional view of an SEM image of the sample substrate used for the sample panel in Example 3.

Example 4

A sample panel in Example 4 includes a sample substrate different from the sample substrate 10Sb in Example 2 in that the second electrode 16 undergoes resin application with an applicator (film applicator, i.e., No. 542-AB automatic film applicator, made by YASUDA SEIKI SEISAKUSHO, LTD.) to thus form the resin layer 17. In forming the resin layer 17, the inventors established a condition similar to that in Example 2, where a 150 nm thick resin layer is formed onto a flat surface.

Figure 5A:
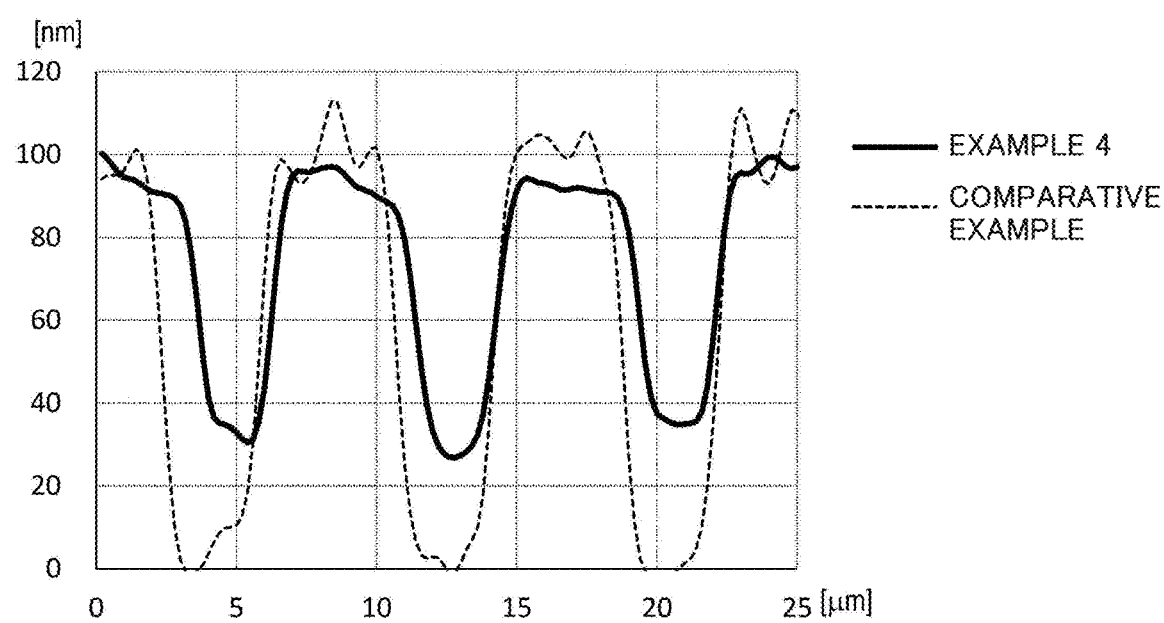
FIG. 5A is a graph showing measurements of the surface profile (the profile of a surface near the resin layer 17) of a sample substrate used for a sample panel in Example 4.
Figure 5B:
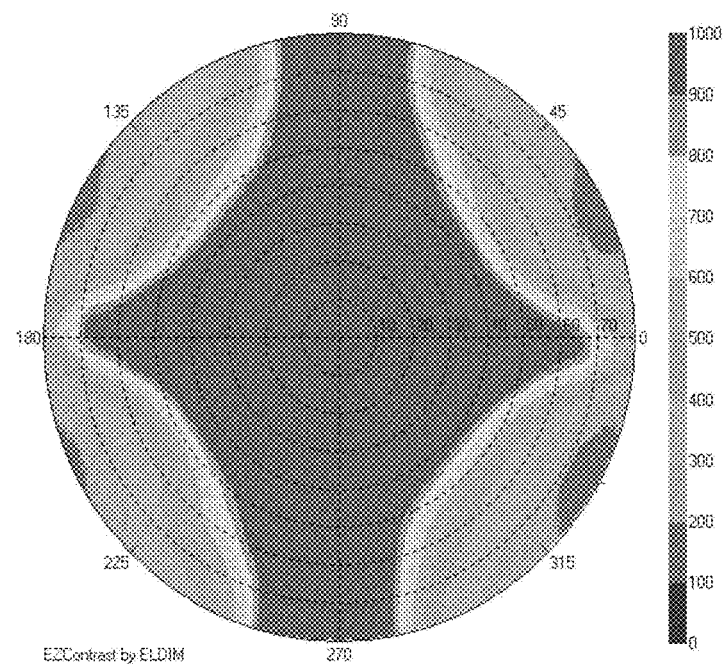
FIG. 5B is a diagram illustrating an iso-contrast curve of the sample panel in Example 4.

FIG. 5A is a graph showing measurements of the surface profile (the profile of a surface near the resin layer 17) of the sample substrate used for the sample panel in Example 4. FIG. 5B is a diagram illustrating an iso-contrast curve of the sample panel in Example 4.

Example 5

Figure 6A:
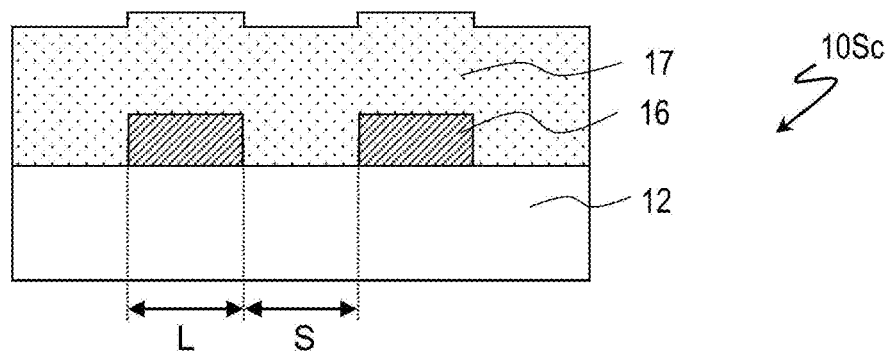
FIG. 6A is a schematic sectional view of a sample substrate 10Sc, which is used for a sample panel in Example 5.

FIG. 6A is a schematic sectional view of a sample substrate 10Sc, which is used for a sample panel in Example 5. Unlike the sample panel in Example 1, which includes the sample substrate 10Sa, the sample panel in Example 5 includes the sample substrate 10Sc. The sample substrate 10Sc of the sample panel in Example 5 is different from the sample substrate 10Sa in Example 1 with regard to the condition for forming the resin layer 17. In Example 5, the inventors repeated resin application onto the second electrode 16 twice on the condition where a 150 nm thick resin layer is formed onto a flat surface.

Figure 6B:
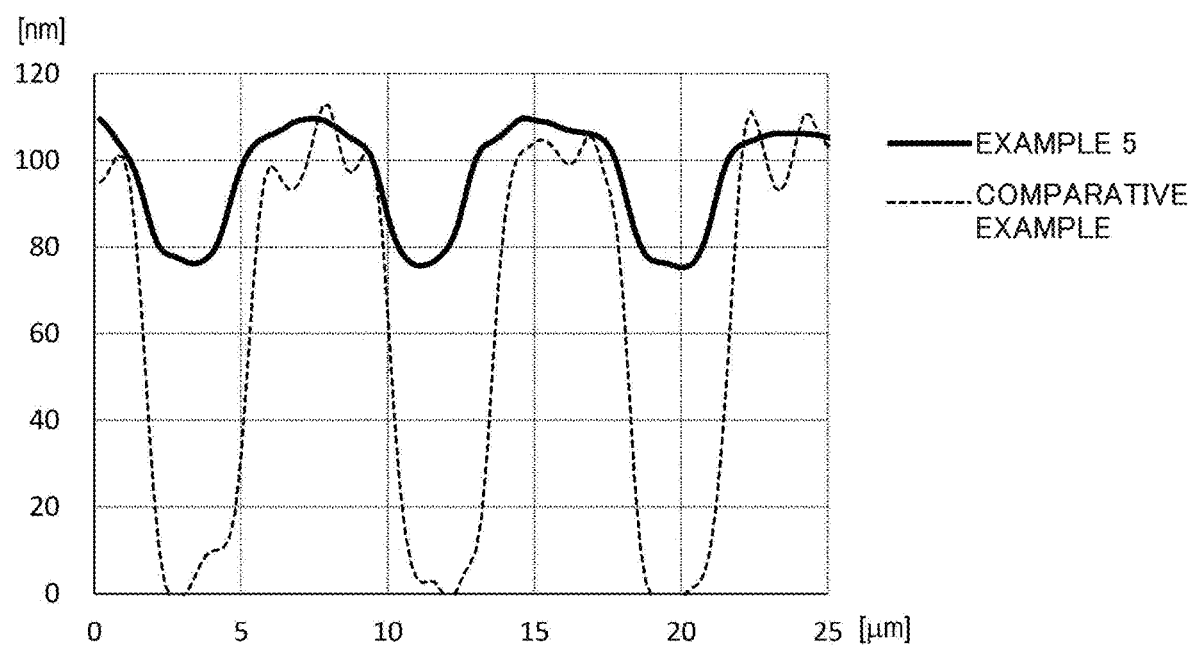
FIG. 6B is a graph showing measurements of the surface profile (the profile of a surface near the resin layer 17) of the sample substrate 10Sc.
Figure 6C:
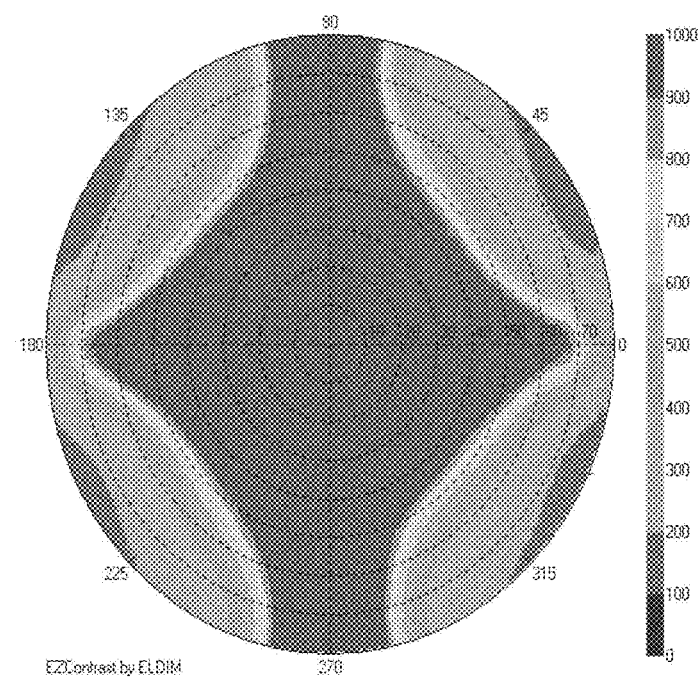
FIG. 6C is a diagram illustrating an iso-contrast curve of the sample panel in Example 5.
Figure 6D:
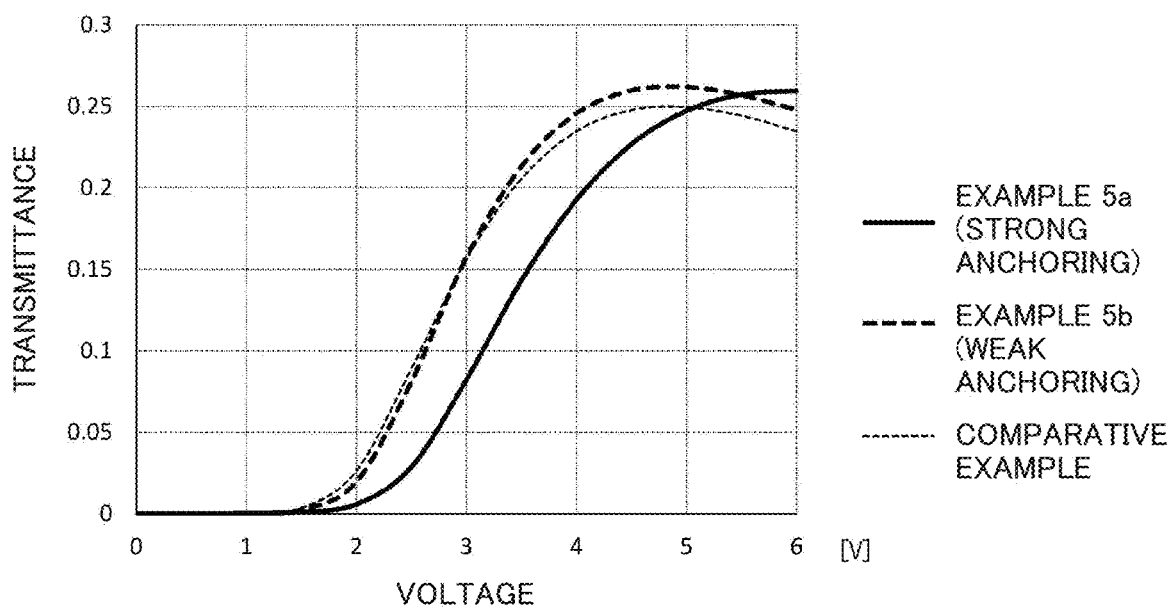
FIG. 6D is a graph showing simulated calculations of the ratio of transmittance in liquid crystal cells to applied voltage (voltage-transmittance curves) in Examples 5a and 5b.

FIG. 6B is a graph showing measurements of the surface profile (the profile of a surface near the resin layer 17) of the sample substrate 10Sc, which is used for the sample panel in Example 5. FIG. 6C is a diagram illustrating an iso-contrast curve of the sample panel in Example 5. FIG. 6D is a graph showing simulated calculations of the ratio of transmittance in liquid crystal cells to applied voltage (voltage-transmittance curves) in Examples 5a and 5b. Unlike the liquid crystal cell in Example 1, the liquid crystal cells in Examples 5a and 5b each have the resin layer 17 of the same thickness as the resin layer 17 of the sample panel in Example 5. The liquid crystal cell in Example 5b is different from the liquid crystal cell in Example 5a with regard to the azimuth anchoring strength of the first alignment film 18. The details are listed below.

The first alignment film 18 of the liquid crystal cell in Example 5a has an azimuth anchoring strength of $1 \times 10^3$ $J/m^2$ (a strong-anchoring alignment film); and The first alignment film 18 of the liquid crystal cell in Example 5b has an azimuth anchoring strength of $6 \times 10^{-5}$ $J/m^2$ (a weak-anchoring alignment film).

Example 6

Figure 7A:
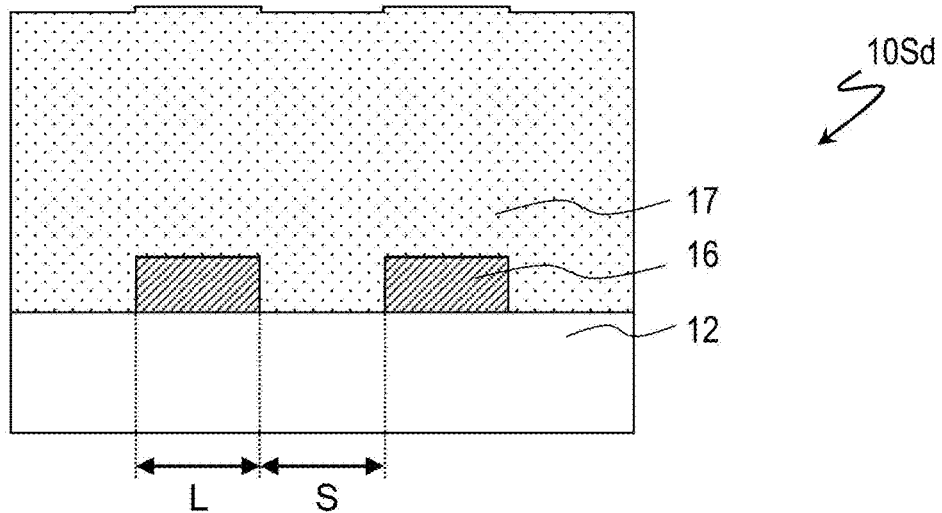
FIG. 7A is a schematic sectional view of a sample substrate 10Sd, which is used for a sample panel in Example 6.

FIG. 7A is a schematic sectional view of a sample substrate 10Sd, which is used for a sample panel in Example 6. Unlike the sample panel in Example 1, which includes the sample substrate 10Sa, the sample panel in Example 6 includes the sample substrate 10Sd. The sample substrate 10Sd of the sample panel in Example 6 is different from the sample substrate 10Sa in Example 1 with regard to the condition for forming the resin layer 17. In Example 6, the inventors repeated resin application onto the second electrode 16 four times on the condition where a 150 nm thick resin layer is formed onto a flat surface.

Figure 7B:
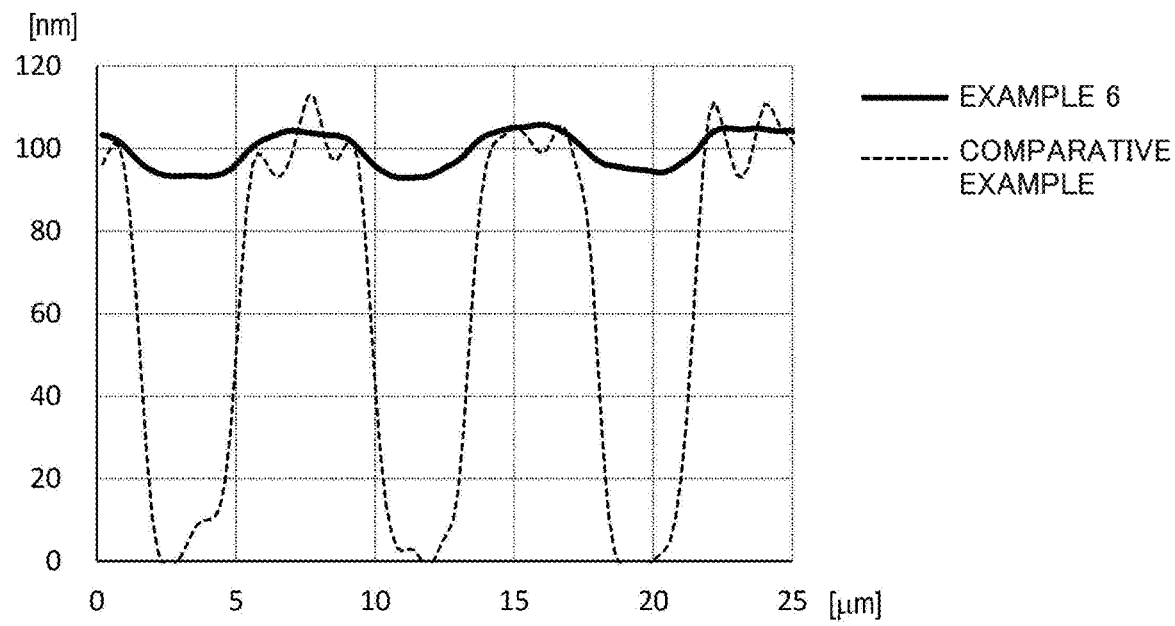
FIG. 7B is a graph showing measurements of the surface profile (the profile of a surface near the resin layer 17) of the sample substrate 10Sd.
Figure 7C:
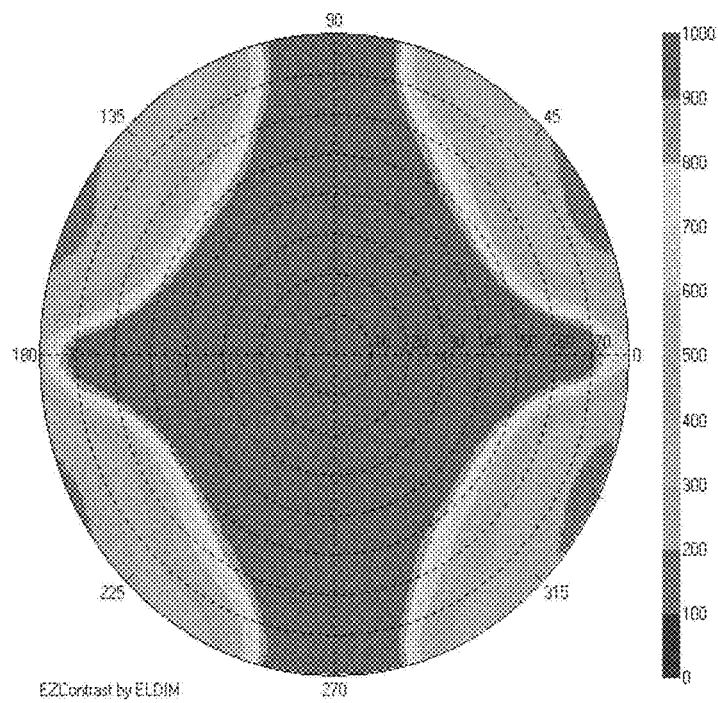
FIG. 7C is a diagram illustrating an iso-contrast curve of the sample panel in Example 6.
Figure 7D:
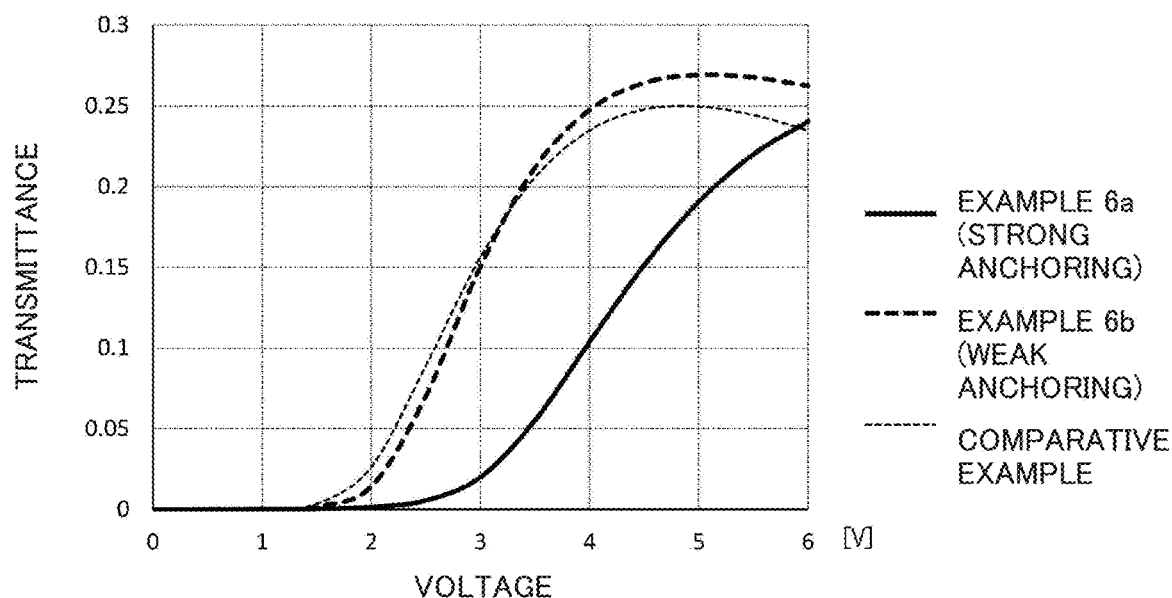
FIG. 7D is a graph showing simulated calculations of the ratio of transmittance in liquid crystal cells to applied voltage (voltage-transmittance curves) in Examples 6a and 6b.

FIG. 7B is a graph showing measurements of the surface profile (the profile of a surface near the resin layer 17) of the sample substrate 10Sd, which is used for the sample panel in Example 6. FIG. 7C is a diagram illustrating an iso-contrast curve of the sample panel in Example 6. FIG. 7D is a graph showing simulated calculations of the ratio of transmittance in liquid crystal cells to applied voltage (voltage-transmittance curves) in Examples 6a and 6b. Unlike the liquid crystal cell in Example 1, the liquid crystal cells in Examples 6a and 6b each have the resin layer 17 of the same thickness as the resin layer 17 of the sample panel in Example 6. The liquid crystal cell in Example 6b is different from the liquid crystal cell in Example 6a with regard to the azimuth anchoring strength of the first alignment film 18. The details are listed below.

The first alignment film 18 of the liquid crystal cell in Example 6a has an azimuth anchoring strength of $1 \times 10^3$ $J/m^2$ (a strong-anchoring alignment film); and The first alignment film 18 of the liquid crystal cell in Example 6b has an azimuth anchoring strength of $3 \times 10^{-5}$ $J/m^2$ (a weak-anchoring alignment film).

Example 7

Figure 8A:
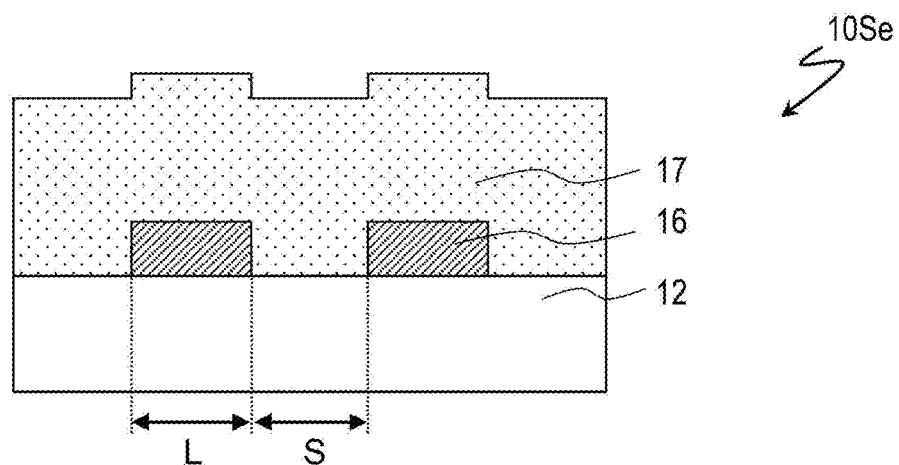
FIG. 8A is a schematic sectional view of a sample substrate 10Se, which is used for a sample panel in Example 7.

FIG. 8A is a schematic sectional view of a sample substrate 10Se, which is used for a sample panel in Example 7. Unlike the sample panel in Example 1, which includes the sample substrate 10Sa, the sample panel in Example 7 includes the sample substrate 10Se. The sample substrate 10Se of the sample panel in Example 7 is different from the sample substrate 10Sa in Example 1 with regard to the condition for forming the resin layer 17. In Example 7, the inventors applied resin onto the second electrode 16 on the condition that a 300 nm thick resin layer is formed onto a flat surface.

Figure 8B:
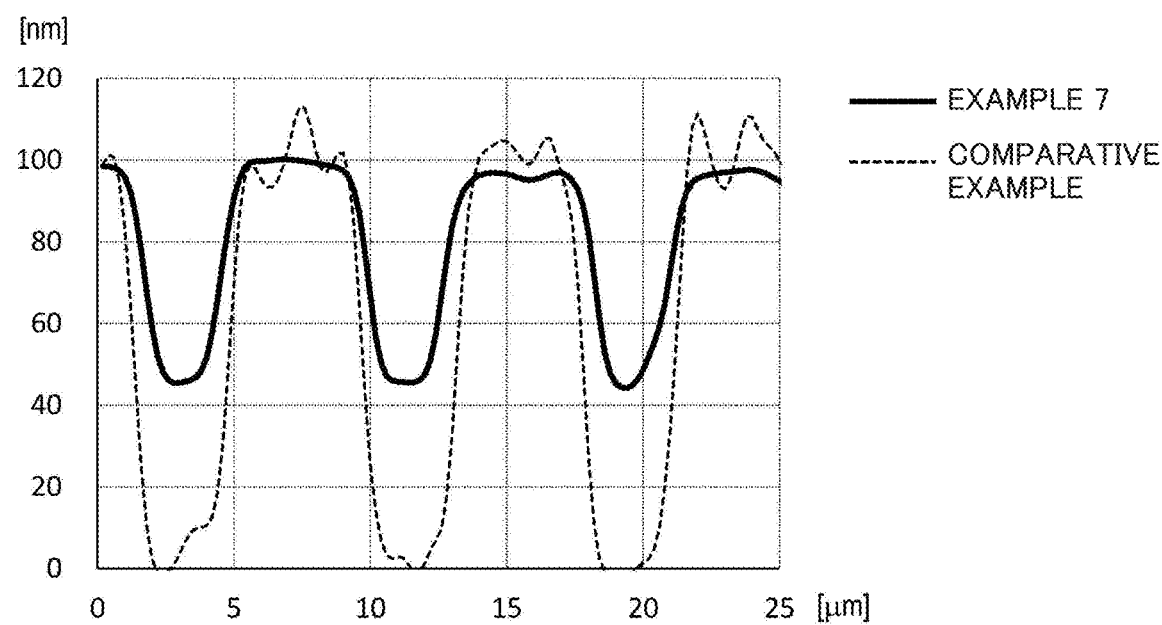
FIG. 8B is a graph showing measurements of the surface profile (the profile of a surface near the resin layer 17) of the sample substrate 10Se.
Figure 8C:
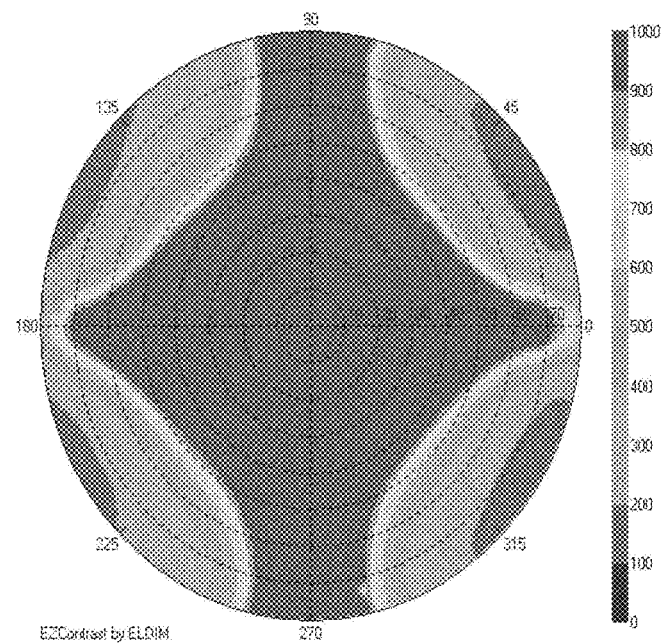
FIG. 8C is a diagram illustrating an iso-contrast curve of the sample panel in Example 7.
Figure 8D:
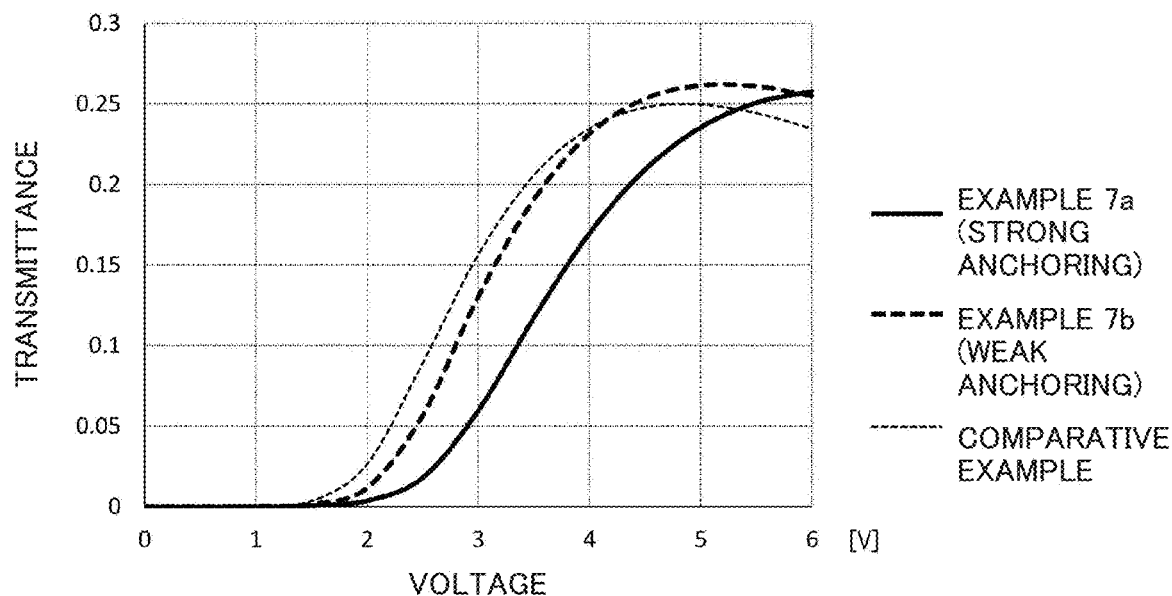
FIG. 8D is a graph showing simulated calculations of the ratio of transmittance in liquid crystal cells to applied voltage (voltage-transmittance curves) in Examples 7a and 7b.

FIG. 8B is a graph showing measurements of the surface profile (the profile of a surface near the resin layer 17) of the sample substrate 10Se, which is used for the sample panel in Example 7. FIG. 8C is a diagram illustrating an iso-contrast curve of the sample panel in Example 7. FIG. 8D is a graph showing simulated calculations of the ratio of transmittance in liquid crystal cells to applied voltage (voltage-transmittance curves) in Examples 7a and 7b. Unlike the liquid crystal cell in Example 1, the liquid crystal cells in Examples 7a and 7b each have the resin layer 17 of the same thickness as the resin layer 17 of the sample panel in Example 7. The liquid crystal cell in Example 7b is different from the liquid crystal cell in Example 7a with regard to the azimuth anchoring strength of the first alignment film 18. The details are listed below.

The first alignment film 18 of the liquid crystal cell in Example 7a has an azimuth anchoring strength of $1 \times 10^3$ $J/m^2$ (a strong-anchoring alignment film); and The first alignment film 18 of the liquid crystal cell in Example 7b has an azimuth anchoring strength of $6 \times 10^{-5}$ $J/m^2$ (a weak-anchoring alignment film).

Example 8

Figure 9A:
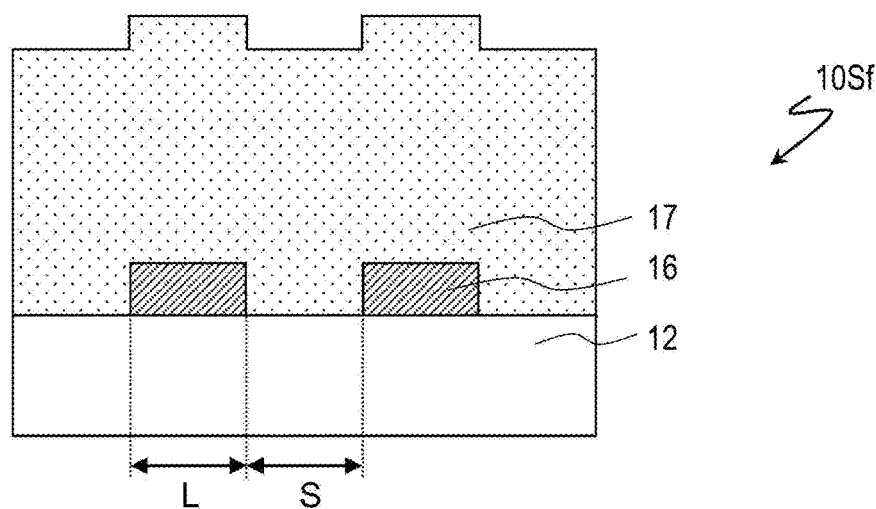
FIG. 9A is a schematic sectional view of a sample substrate 10Sf, which is used for a sample panel in Example 8.

FIG. 9A is a schematic sectional view of a sample substrate 10Sf, which is used for a sample panel in Example 8. Unlike the sample panel in Example 1, which includes the sample substrate 10Sa, the sample panel in Example 8 includes the sample substrate 10Sf. The sample substrate 10Sf of the sample panel in Example 8 is different from the sample substrate 10Sa in Example 1 with regard to the condition for forming the resin layer 17. In Example 8, the inventors applied resin onto the second electrode 16 on the condition that a 500 nm thick resin layer is formed onto a flat surface.

Figure 9B:
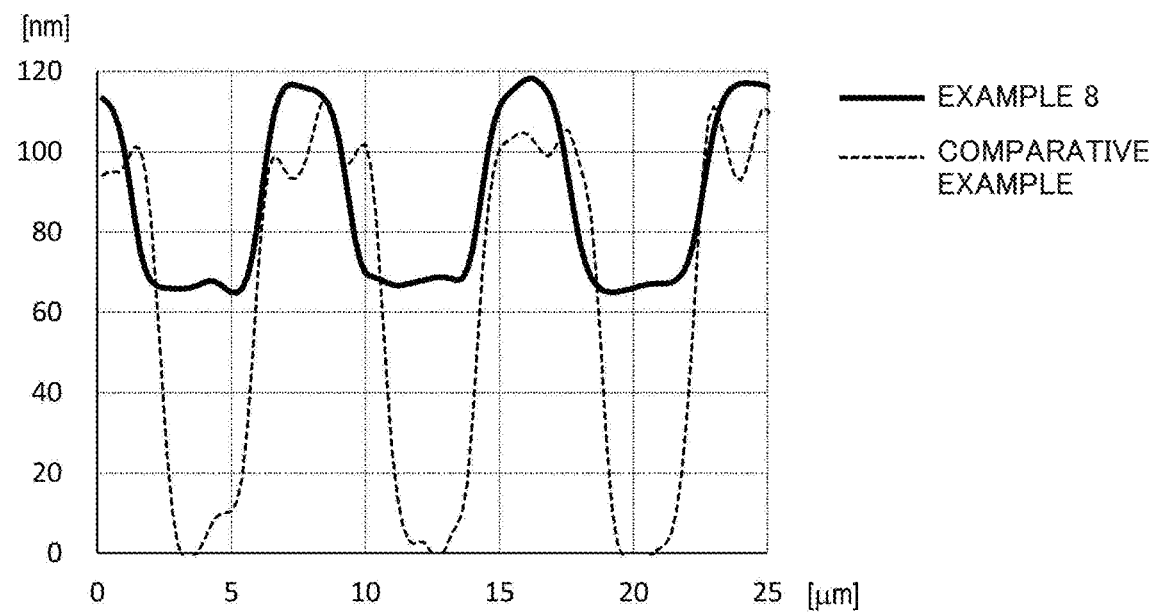
FIG. 9B is a graph showing measurements of the surface profile (the profile of a surface near the resin layer 17) of the sample substrate 10Sf.
Figure 9C:
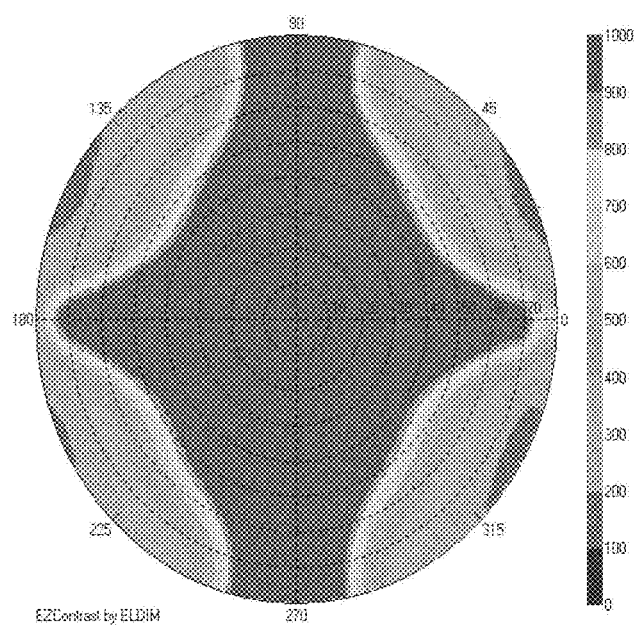
FIG. 9C is a diagram illustrating an iso-contrast curve of the sample panel in Example 8.

FIG. 9B is a graph showing measurements of the surface profile (the profile of a surface near the resin layer 17) of the sample substrate 10Sf, which is used for the sample panel in Example 8. FIG. 9C is a diagram illustrating an iso-contrast curve of the sample panel in Example 8.

Example 9

Figure 10A:
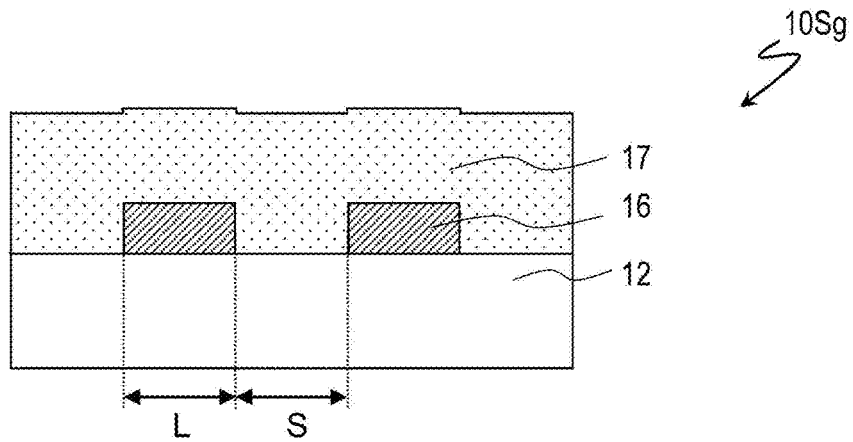
FIG. 10A is a schematic sectional view of a sample substrate 10Sg, which is used for a sample panel in Example 9.
Figure 10B:
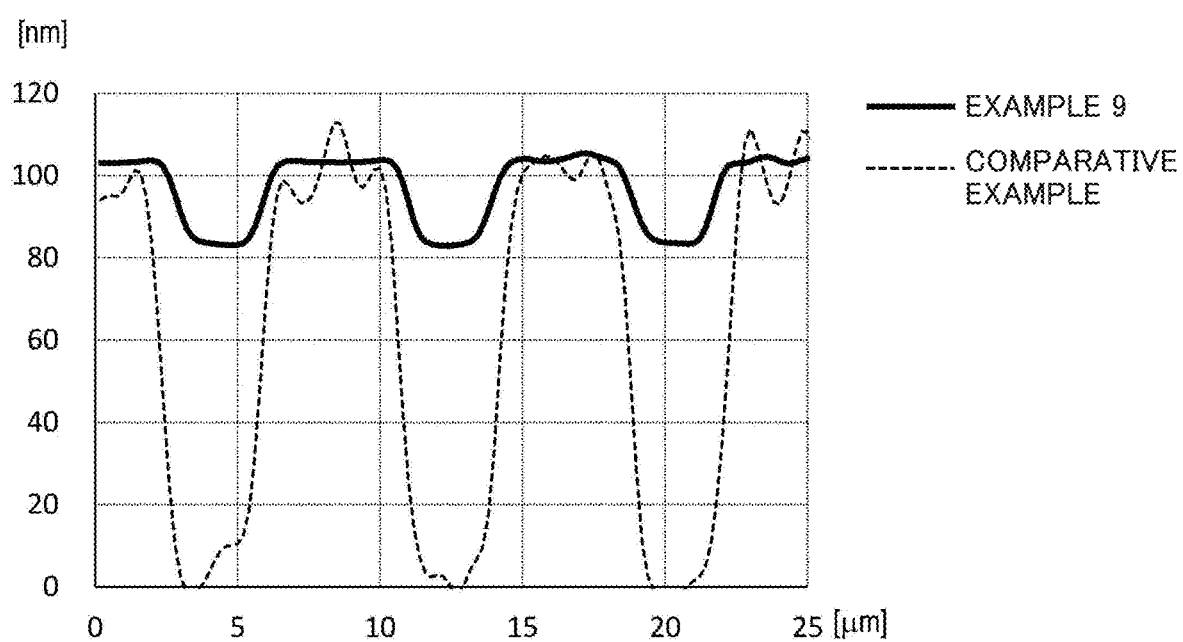
FIG. 10B is a graph showing measurements of the surface profile (the profile of a surface near the resin layer 17) of the sample substrate 10Sg.
Figure 10C:
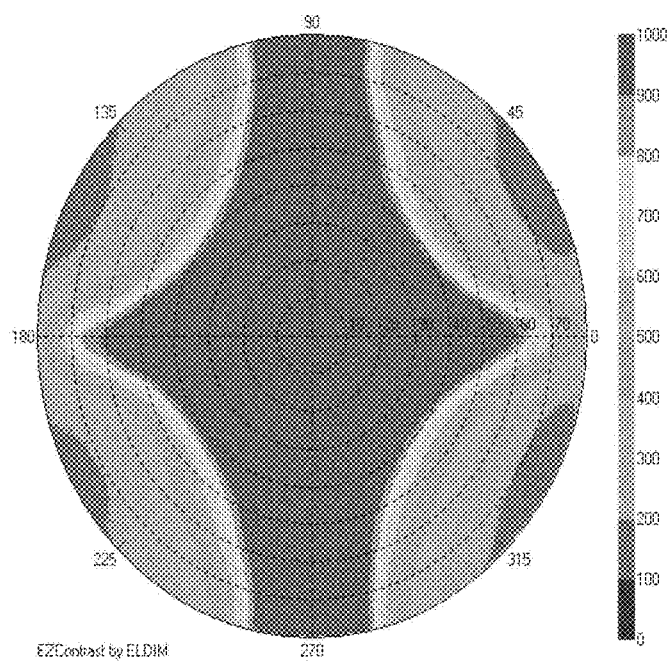
FIG. 10C is a diagram illustrating an iso-contrast curve of the sample panel in Example 9.
Figure 10D:
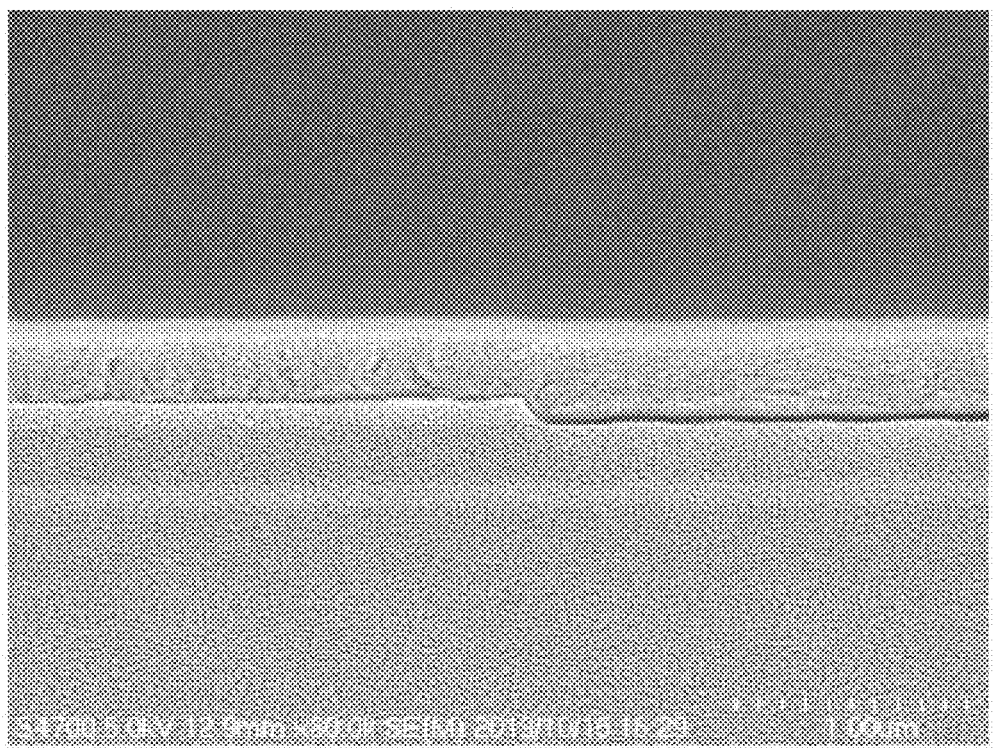
FIG. 10D is a sectional view of an SEM image of the sample substrate 10Sg.

FIG. 10A is a schematic sectional view of a sample substrate 10Sg, which is used for a sample panel in Example 9. Unlike the sample panel in Example 1, which includes the sample substrate 10Sa, the sample panel in Example 9 includes the sample substrate 10Sg. The sample substrate 10Sg of the sample panel in Example 9 is different from the sample substrate 10Sa in Example 1 with regard to the resin material of the resin layer 17 and the condition for forming the resin layer 17. In Example 9, the inventors applied resin onto the second electrode 16 by using a resin having a refractive index of 1.57 (Hitaroid 7663, made by Hitachi Chemical Co., Ltd.) on the condition that a 292 nm thick resin layer is formed onto a flat surface. FIG. 10B is a graph showing measurements of the surface profile (the profile of a surface near the resin layer 17) of the sample substrate 10Sg, which is used for the sample panel in Example 9. FIG. 10C is a diagram illustrating an iso-contrast curve of the sample panel in Example 9. FIG. 10D is a sectional view of an SEM image of the sample substrate 10Sg, which is used for the sample panel in Example 9.

Comparative Example

Figure 11A:
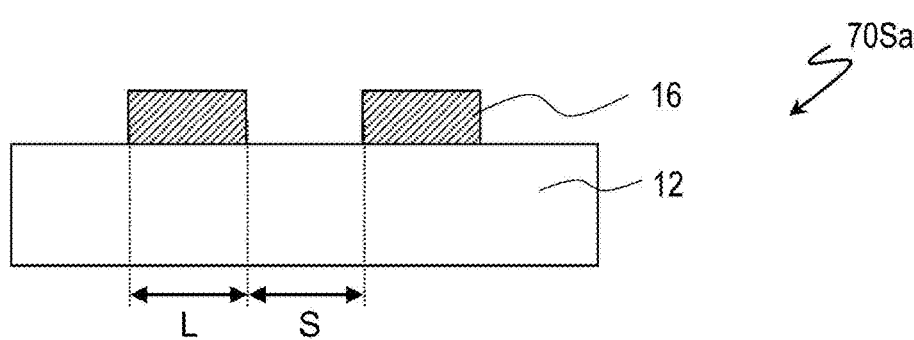
FIG. 11A is a schematic sectional view of a sample substrate 70Sa, which is used for a sample panel in a comparative example.
Figure 11B:
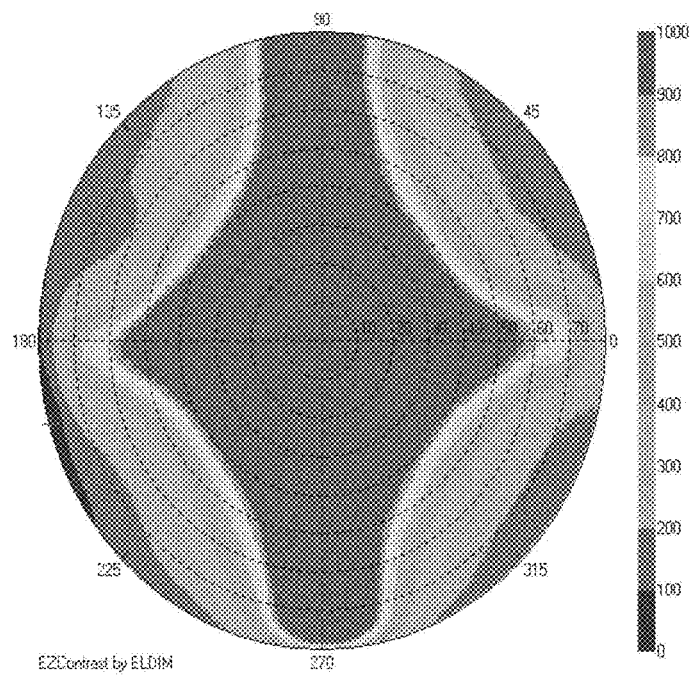
FIG. 11B is a diagram illustrating an iso-contrast curve of the sample panel in the comparative example.

FIG. 11A is a schematic sectional view of a sample substrate 70Sa, which is used for a sample panel in the comparative example Unlike the sample panel in Example 1, which includes the sample substrate 10Sa, the sample panel in the comparative example includes the sample substrate 70Sa. Unlike the sample substrate 10Sa, the sample substrate 70Sa of the sample panel in the comparative example includes no resin layer 17. FIG. 11B is a diagram illustrating an iso-contrast curve of the sample panel in the comparative example.

Reference Example

Figure 12:
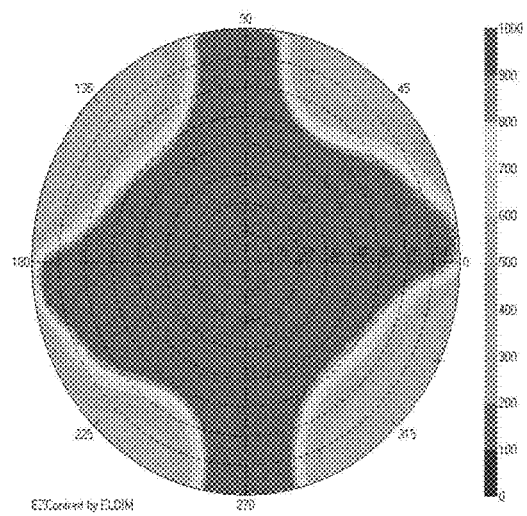
FIG. 12 is a diagram illustrating an iso-contrast curve of a sample panel in a reference example.

FIG. 12 is a diagram illustrating an iso-contrast curve of a sample panel in a reference example. Unlike the sample panel in Example 1, the sample panel in the reference example includes a glass substrate instead of the sample substrate 10Sa. The glass substrate of the sample panel in the reference example is identical to the glass substrate 12 of the sample panel in Example 1.

Table 1 below shows the average of contrast ratios at a 45° azimuth angle and a 60° polar angle, at a −45° azimuth angle and a 60° polar angle, at a 135° azimuth angle and a 60° polar angle, and at a −135° azimuth angle and a 60° polar angle.

TABLE 1

| | Example 1 | Example 2 | Example 3 | Example 4 | Examples 5, 5a, and 5b | Examples 6, 6a, and 6b | Examples 7, 7a, and 7b | Example 8 | Example 9 | Comparative example | Reference example |
|---|---|---|---|---|---|---|---|---|---|---|---|
| Thickness D2 of resin layer 17 [nm] (over straight portion 16s of second electrode 16) | 77 | 118 | 118 | 118 | 216 | 483 | 304 | 510 | 211 | — | — |
| Thickness D1 of resin layer 17 [nm] (inside slits 16a of second electrode 16) | 108 | 168 | 168 | 168 | 290 | 580 | 360 | 553 | 300 | — | — |
| Surface level difference Ds of resin layer 17 [nm] | 77 | 58 | 58 | 58 | 34 | 11 | 52 | 65 | 19 | — | — |
| Ds/D1 ratio | 71% | 5% | 35% | 35% | 12% | 2% | 14% | 12% | 6% | — | — |
| Method of forming resin layer 17 | Spin coating | Spin coating | Spin coating | Spin coating after excimer UV irradiation | Applicator | Spin coating | Spin coating | Spin coating | Spin coating | | |
| Condition for forming resin layer 17 (thickness for formation on flat surface × number of times) | 50 nm × 1 time | 150 nm × 1 time | 150 nm × 1 time | 150 nm × 1 time | 150 nm × 1 time | 150 nm × 4 times | 300 nm × 1 time | 500 nm × 1 time | 292 nm × 1 time | — | — |
| Refractive index of resin layer 17 | 1.76 | 1.76 | 1.76 | 1.76 | 1.76 | 1.76 | 1.76 | 1.76 | 1.57 | — | — |

TABLE 1-continued

| | Example 1 | Example 2 | Example 3 | Example 4 | Examples 5, 5a, and 5b | Examples 6, 6a, and 6b | Examples 7, 7a, and 7b | Example 8 | Example 9 | Comparative example | Reference example |
|---|---|---|---|---|---|---|---|---|---|---|---|
| Contrast ratio | 371 | 302 | 393 | 428 | 381 | 481 | 348 | 459 | 334 | 280 | 559 |
| Voltage-transmittance curve (simulation) Azimuth anchoring strength of first alignment film 18 | | $1 \times 10^3$ J/m$^2$ | $1 \times 10^3$ J/m$^2$ | — | — | Example 5a: $1 \times 10^3$ J/m$^2$ Example 5b: $6 \times 10^{-5}$ J/m$^2$ | Example 6a: $1 \times 10^3$ J/m$^2$ Example 6b: $3 \times 10^{-5}$ J/m$^2$ | Example 7a: $1 \times 10^3$ J/m$^2$ Example 7b: $6 \times 10^{-5}$ J/m$^2$ | | | |
| Azimuth anchoring strength of second alignment film 28 | | $1 \times 10^3$ J/m$^2$ | $1 \times 10^3$ J/m$^2$ | — | — | $1 \times 10^3$ J/m$^2$ | $1 \times 10^3$ J/m$^2$ | $1 \times 10^3$ J/m$^2$ | | | |

A comparison between the reference example and comparative example has demonstrated that the sample panel in the comparative example, which includes the second electrode 16, has a lower contrast ratio at an oblique azimuth and an oblique visual angle than the sample panel in the reference example, which includes no second electrode 16. The comparison has demonstrated that the electrode structure having the slits and conductive portion produces diffraction light, thereby lowering the contrast ratio at an oblique azimuth and an oblique visual angle. The foregoing experiment has shown that Examples 1 to 9, each of which provides the resin layer 17, offer a further improved contrast ratio at an oblique azimuth and an oblique visual angle than the comparative example. The resin layer 17 has a surface level difference Ds of 10 nm or more in all Examples 1 to 9.

The results in Examples 1 to 9 have revealed that the contrast ratio at an oblique azimuth and an oblique visual angle tends to improve along with decrease in the surface level difference Ds of the resin layer 17. Example 6, where the resin layer 17 has the smallest surface level difference Ds of all the examples (i.e., Examples 1 to 9), offers the highest contrast ratio at an oblique azimuth and an oblique visual angle.

Referring to resin application onto the second electrode 16 to form the resin layer 17, a comparison is made between Examples 5 and 7. Example 5, where the resin application is performed multiple times individually, offers a smaller surface level difference Ds of the resin layer 17 as formed than Example 7, where the resin application is performed one time. Example 5 achieves a higher contrast ratio at an oblique azimuth and an oblique visual angle than Example 7.

A comparison is now made between Examples 2, 7 and 8, where resin application for forming the resin layer 17 is performed one time through spin coating. Example 8, where the resin layer 17 is the thickest of all the resin layers 17 in these examples, achieves the highest contrast ratio at an oblique azimuth and an oblique visual angle. Here, the resin layer 17 in Example 8 does not have the smallest surface level difference Ds of all the resin layers 17 in these examples.

A comparison is now made between Examples 2 and 3. Example 3, where before the resin layer 17 is formed, the second electrode 16 undergoes processing to have a hydrophilic surface, achieves a further improved contrast ratio at an oblique azimuth and an oblique visual angle than Example 2, where such processing is not performed.

A comparison is now made between Examples 2 and 4. Example 4, which includes resin application with an applicator to form the resin layer 17, achieves a further improved contrast ratio at an oblique azimuth and an oblique visual angle than Example 2, which includes resin application through spin coating.

In Example 9, the resin layer 17 is formed using a resin different from that in Examples 1 to 8. In Examples 1 to 8, the resin layer 17 has a refractive index of 1.76, and the second electrode 16 has a refractive index of 1.72. The difference dn between these refractive indexes (obtained by subtracting the refractive index of the second electrode 16 from the refractive index of the resin layer 17), is 0.04. In Example 9 by contrast, the resin layer 17 has a refractive index of 1.57, and the difference dn between the refractive index of the resin layer 17 and the refractive index of the second electrode 16 is −0.15. This comparison has demonstrated that a difference of 0.20 or less in refractive index (i.e., the absolute value of the difference dn) achieves an improvement in the contrast ratio at an oblique azimuth and an oblique visual angle even when the resin layer 17 has a greater or smaller refractive index than the second electrode 16.

The liquid crystal display panel 100 includes the first alignment film 18 between the resin layer 17 and liquid crystal layer 32, as illustrated in FIG. 1A, whereas the sample panels in Examples 1 to 9 each include no such alignment film. The first alignment film 18 has a refractive index of about 1.55 to 1.75 and a thickness of about 50 to 100 nm. Hence, the first alignment film 18 alone (i.e., without the resin layer 17) seems to a little improve the contrast ratio at an oblique azimuth and an oblique visual angle.

Reference is made to the results of a simulation on a voltage-transmittance curve. The voltage-transmittance curves for the liquid crystal cells in Examples 1 and 2 are a little shifted from the voltage-transmittance curve for the liquid crystal cell in the comparative example toward high voltage. That is, providing the resin layer 17 offers a small reduction in effective voltage applied to the liquid crystal layer, because a weak-anchoring alignment film does not have to be used as the first alignment film 18 in order to compensate for a reduction in effective voltage. In contrast, the voltage-transmittance curves for the liquid crystal cells in Examples 5a, 6a and 7a are shifted from the voltage-transmittance curve for the liquid crystal cell in the comparative example toward high voltage. The voltage-transmittance curves for the liquid crystal cells in Examples 5b, 6b and 7b demonstrate that using a weak-anchoring alignment film as the first alignment film 18 can compensate for a shift toward high voltage.

The foregoing preferred embodiment has described, by way of example, a liquid crystal display panel that has linear slits and operates in FFS mode. In some preferred embodiments, curved slits may be provided, and such a configuration is applicable to a transverse-field-mode liquid crystal display panel that has an electrode structure having straight portions that can cause light diffraction. The liquid crystal display panel according to the preferred embodiment of the present invention is not limited to a liquid crystal display panel that operates in FFS mode, and the panel may be a liquid crystal display panel that operates in IPS mode.

INDUSTRIAL APPLICABILITY

The disclosure is widely applicable to a liquid crystal display panel that has an electrode structure with slits and operates in transverse-field mode.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A liquid crystal display panel comprising:
a first substrate;
a second substrate facing the first substrate;
a liquid crystal layer disposed between the first and second substrates;
a first polarizer plate disposed across the first substrate from the liquid crystal layer; and
a second polarizer plate disposed across the second substrate from the liquid crystal layer,
wherein the first substrate includes
a first dielectric substrate,
a first electrode and a second electrode both disposed on the first dielectric substrate and capable of generating a transverse electric field in the liquid crystal layer, and
a first alignment film being in contact with the liquid crystal layer,
the second electrode includes
a plurality of slits, and
a conductive portion,
the second substrate includes
a second dielectric substrate, and
a second alignment film disposed on the second dielectric substrate and being in contact with the liquid crystal layer,
the first substrate further includes
a resin layer disposed between the second electrode and the first alignment film, the resin layer being made of a resin having a refractive index different from a refractive index of the second electrode by 0.20 or less,
the resin layer within the plurality of slits is as thick as or thicker than the second electrode,
the plurality of slits are filled with the resin layer, and
a difference in height between the resin layer over the conductive portion of the second electrode and the resin layer within the plurality of slits of the second electrode is 10 nm or more.

2. The liquid crystal display panel according to claim 1, wherein
the first electrode is more remote from the liquid crystal layer than the second electrode is, so as to face the second electrode with a dielectric layer interposed between the first and second electrodes, and
the first electrode has no slits.

3. The liquid crystal display panel according to claim 1, wherein
the conductive portion of the second electrode has a hydrophilic surface.

4. The liquid crystal display panel according to claim 1, wherein
the resin layer within the plurality of slits is thicker than the second electrode by two times or more.

5. The liquid crystal display panel according to claim 1, wherein
the first alignment film has an azimuth anchoring strength of $1 \times 10^{-7}$ to $1 \times 10^{-5}$ J/m$^2$ inclusive.

6. The liquid crystal display panel according to claim 1, wherein
the second alignment film has an azimuth anchoring strength of $1 \times 10^{-3}$ J/m$^2$ or more.

7. The liquid crystal display panel according to claim 1, wherein
the resin layer has a refractive index equal to or smaller than ±10% of a refractive index of the second electrode.

8. The liquid crystal display panel according to claim 1, wherein
the second electrode is composed of a transparent conductive layer.

9. The liquid crystal display panel according to claim 1, wherein
the second polarizer plate has an absorption axis forming, along with a direction where the plurality of slits extend, an angle of 5 to 10 degrees inclusive.

10. The liquid crystal display panel according to claim 1, wherein
the liquid crystal display panel has a contrast ratio of 200 or more, on an average of pairs of a 45° azimuth angle and a 60° polar angle, a −45° azimuth angle and a 60° polar angle, a 135° azimuth angle and a 60° polar angle, and a −135° azimuth angle and a 60° polar angle.

11. A method for manufacturing the liquid crystal display panel according to claim 1, the method comprising
applying, with an applicator, the resin onto the second electrode to form the resin layer.

12. A method for manufacturing the liquid crystal display panel according to claim 1, the method comprising
applying the resin onto the second electrode through spin coating to form the resin layer.

13. The method according to claim 12, wherein
the step of applying the resin through spin coating is performed a plurality of times.

14. The method according to claim 11, further comprising
before the applying step, processing a surface of the second electrode into a hydrophilic surface.

15. The method according to claim 14, wherein
the processing step includes irradiating the surface of the second electrode with excimer UV rays.

16. The method according to claim 12, further comprising
before the applying step, processing a surface of the second electrode into a hydrophilic surface.

17. The method according to claim 16, wherein
the processing step includes irradiating the surface of the second electrode with excimer UV rays.

* * * * *